(12) United States Patent
Paul

(10) Patent No.: US 11,093,120 B1
(45) Date of Patent: Aug. 17, 2021

(54) SYSTEMS AND METHODS FOR GENERATING AND BROADCASTING DIGITAL TRAILS OF RECORDED MEDIA

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/991,521

(22) Filed: Aug. 12, 2020

(51) Int. Cl.
*G06F 3/0482* (2013.01)
*G06F 3/0484* (2013.01)

(52) U.S. Cl.
CPC .......... *G06F 3/0484* (2013.01); *G06F 3/0482* (2013.01)

(58) Field of Classification Search
CPC ..................................................... G06F 3/0482
See application file for complete search history.

(56) References Cited

U.S. PATENT DOCUMENTS

| | | | | |
|---|---|---|---|---|
| 9,934,772 | B1* | 4/2018 | Yoelin | G10H 1/361 |
| 10,374,994 | B1* | 8/2019 | Viklund | H04W 4/12 |
| 10,656,797 | B1* | 5/2020 | Am | H04L 51/20 |
| 10,693,819 | B1* | 6/2020 | Boyd | H04L 51/18 |
| 10,803,120 | B1* | 10/2020 | Hu | G06F 16/9537 |
| 2006/0248105 | A1* | 11/2006 | Goradia | G10H 1/0008 |
| 2008/0098005 | A1* | 4/2008 | Goradia | G06F 16/9535 |
| 2009/0258710 | A1* | 10/2009 | Quatrochi | A61B 5/6807 463/43 |
| 2011/0224000 | A1* | 9/2011 | Toga | A63F 13/424 463/42 |
| 2012/0165100 | A1* | 6/2012 | Lalancette | A63F 13/44 463/42 |
| 2014/0096167 | A1* | 4/2014 | Lang | H04N 21/4223 725/91 |
| 2014/0282080 | A1* | 9/2014 | Garner | G06F 16/176 715/752 |
| 2014/0328574 | A1* | 11/2014 | Sandberg | G11B 27/036 386/280 |

(Continued)

OTHER PUBLICATIONS

Keith Nelson Jr., "Rhymes With Reason uses Kendrick Lamar and Drake lyrics to teach kids vocabulary", available on Jul. 8, 2019, available at <<https://www.revolt.tv/2019/7/8/20839030/rhymes-with-reason-uses-kendrick-lamar-and-drake-lyrics-to-teach-kids-vocabulary>>, 11 pages (Year: 2019).*

(Continued)

*Primary Examiner* — Daniel Rodriguez
(74) *Attorney, Agent, or Firm* — FisherBroyles, LLP

(57) ABSTRACT

A computer-implemented method for generating and broadcasting digital trails of recorded media may include (i) receiving user input initiating a digital trail, the user input including a selection of a trail mode from a list of candidate modes, (ii) creating a digital trail container configured to contain a series of thematically related media recordings generated by users invited to contribute to the digital trail, (iii) providing, to one or more users, a creation prompt that corresponds to the trail mode, (iv) adding, to the digital trail container, at least one media recording received in response to providing the creation prompt, and (v) displaying the resulting digital trail by sequentially presenting each media recording added to the digital trail container in the order added. Various other methods, systems, and computer-readable media are also disclosed.

20 Claims, 13 Drawing Sheets

(56) References Cited

U.S. PATENT DOCUMENTS

| | | | |
|---|---|---|---|
| 2015/0006369 A1* | 1/2015 | Soroka | G06Q 50/184 705/39 |
| 2015/0120308 A1* | 4/2015 | Leistikow | G10H 1/366 704/500 |
| 2015/0172069 A1* | 6/2015 | Lin | H04L 51/04 715/756 |
| 2016/0188153 A1* | 6/2016 | Lerner | H04L 51/10 709/206 |
| 2017/0208362 A1* | 7/2017 | Flores | H04L 65/60 |
| 2018/0025004 A1* | 1/2018 | Koenig | G06F 16/686 715/748 |
| 2018/0158441 A1* | 6/2018 | Zhao | G10H 1/0008 |
| 2018/0234738 A1* | 8/2018 | Sarkar | H04N 21/2743 |
| 2018/0308462 A1* | 10/2018 | Wang | G06F 3/165 |
| 2019/0066730 A1* | 2/2019 | Singh | G06F 16/78 |
| 2019/0087000 A1* | 3/2019 | Ricknas | G06F 3/0481 |
| 2019/0244639 A1* | 8/2019 | Benedetto | G11B 27/036 |
| 2019/0259360 A1* | 8/2019 | Yoelin | G10H 1/366 |
| 2019/0355337 A1* | 11/2019 | Steinwedel | H04N 21/440236 |
| 2019/0385411 A1* | 12/2019 | Lucas | G06T 19/003 |
| 2020/0259876 A1* | 8/2020 | Evans | H04L 65/4038 |

OTHER PUBLICATIONS

Emotive Lounge, Use my last word . . . first, (word game), available Apr. 3, 2013, available at <<https://emotivalounge.proboards.com/thread/14465/use-last-word-first-game?page%5Cu003d932&page=346>>, 11 pages (Year: 2013).*

"Parents' Ultimate Guide to TikTok", URL: https://www.commonsensemedia.org/blog/parents-ultimate-guide-to-tiktok#:~:text=TikTok%20is%20a%20social%20network,lip%2Dsynching%20to%20popular%20songs.&text=Users%20can%20create%20and%20upload,topics%2C%20songs%2C%20and%20styles, Common Sense Media, last accessed at Jun. 9, 2020, 28 pages.

Paul, Debashish, "Systems and Methods for Maintaining a Digital Trail Framework", U.S. Appl. No. 16/991,525, filed Aug. 12, 2020, 140 pages.

Paul, Debashish, "Systems and Methods for Generating and Broadcasting Digital Trails of Visual Media", U.S. Appl. No. 16/991,514, filed Aug. 12, 2020, 83 pages.

Paul, Debashish, "Display Screen With a Graphical User Interface", U.S. Appl. No. 29/746,199, filed Aug. 12, 2020, 14 pages.

Paul, Debashish, "Display Screen With a Graphical User Interface", U.S. Appl. No. 29/746,197, filed Aug. 12, 2020, 12 pages.

* cited by examiner

SYSTEMS AND METHODS FOR GENERATING AND BROADCASTING DIGITAL TRAILS OF RECORDED MEDIA

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
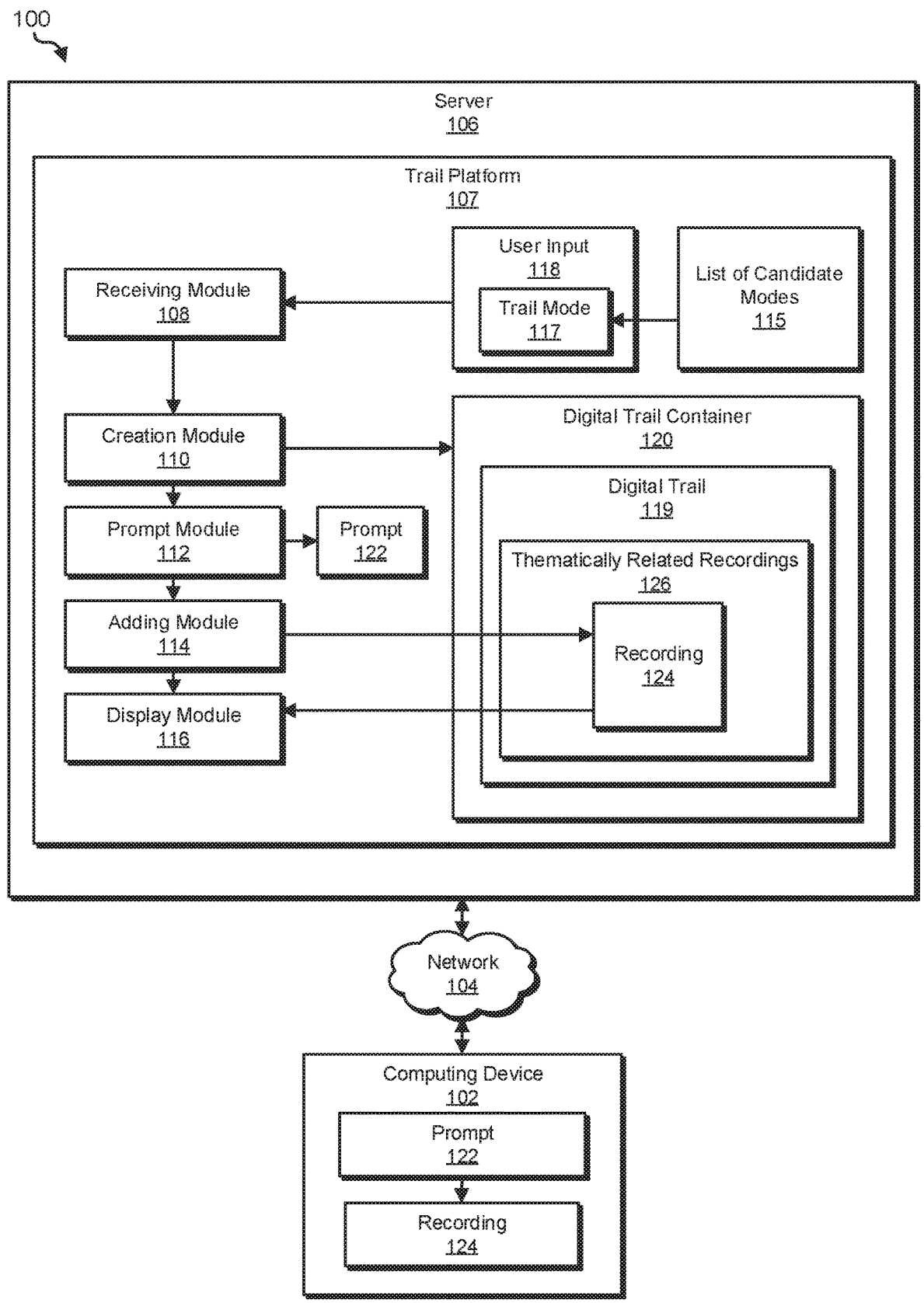
FIG. 1 is a block diagram of an exemplary system for generating and broadcasting digital trails of recorded media.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for creating non-ephemeral series of linked compositions of user-generated content (i.e., trails) with recordings created by users. In some embodiments, the systems described herein may support multiple different recording-based modes for trails. Such modes may include a group karaoke mode, a rap battle mode, a modern antakshari mode, a live radio mode, and/or a podcast mode. In the group karaoke mode, each composition within a trail may represent a video recording of a user singing a different segment of a particular song selected by a trail initiator. In the rap battle mode, each composition within a trail may represent a video recording of a user raping according to content requirements (e.g., a required set of words to be included in a rap) selected by a trail initiator.

In the modern antakshari mode, each composition within a trail may represent a video recording of a user singing a song in which the first word of the song matches the last word of a song sung in the video recording immediately preceding the video recording within the trail. In the live radio mode, compositions within a trail may alternate between a trigger composition created by a trail-initiator (e.g., via an account corresponding to a radio show) and one or more response compositions created by a trail-responder (e.g., via an account of a user consuming the radio show). In this mode, the trigger composition may include a prompt for response compositions of a particular type (e.g., audio compositions) that include particular content (e.g., a description of a dating predicament).

Finally, in the podcast mode, a media stream (e.g., a podcast) may be provided within a trail interface, along with a media-response trail corresponding to the media stream. The trail interface may enable users to create compositions responding to the media stream. In some embodiments, the systems described herein may facilitate the creation of any kind of trail that involves user-created audio and/or video recordings.

As will be explained in greater detail below, embodiments of the instant disclosure may automate portions of a group composition process, thereby eliminating the need for trail participants to manually edit the recorded segments into a cohesive whole. An automated group editing process may be particularly useful to groups of individuals who may not be able to physical interact with each other, enabling them to easily create group recordings without the need to be physically present in the same room. The systems and methods described herein may improve the functioning of a computer itself by improving the computer's ability to provide compiled digital trails based on user input and further enable computers to provide community-oriented interactions centered around group recordings of visual and/or audio media. Trail platforms may additionally improve the functioning of privacy controls on social media sites by enabling individual contributors to a group recording to selectively manage their own recorded segment independently from other segments in the trail.

The systems described herein may be implemented in a variety of ways. FIG. 1 is a block diagram of an exemplary system 100 for generating and broadcasting digital trails of recorded media. In one embodiment, and as will be described in greater detail below, a server 106 may be configured with a receiving module 108 that may receive user input 118 initiating a digital trail 119. In some examples, user input 118 may include a selection of a trail mode 117 from a list of candidate modes 115. In response to user input 118, a creation module 110 may create a digital trail container 120 configured to contain a series of thematically related media recordings 126 generated by users invited to contribute to the digital trail. A prompt module 112 may provide, to one or more users, a prompt 122 that corresponds to the trail mode. After prompt module 112 provides prompt 122, an adding module 114 may add, to digital trail container 120, a recording 124 received in response to providing prompt 122. Display module 116 may display the resulting digital trail by sequentially presenting each media recording of thematically related media recordings 126 added to digital trail container 120 in the order added.

In some embodiments, some or all of the previously described modules may be hosted on server 106. Although illustrated as a single element, server 106 may broadly represent any physical or virtual server and/or group of physical and/or virtual servers connected by one or more networks. In some embodiments, server 106 may communicate with a computing device 102 via a network 104. In one embodiment, computing device 102 may represent a personal computing device operated by a user, such as a mobile phone, tablet, or laptop. In some examples, the systems described herein may present prompt 122 via computing device 102 and/or receive recording 124 via computing device 102.

In some examples, server 106 may perform social networking functions in conjunction with a social media service. In these examples, a user of computing device 102 may be a member of the social media service and computing device 102 may have installed an instance of a social media application that operates as part of the social media service. Additionally or alternatively, computing device 102 may have installed a browser that may navigate to one or more webpages maintained by the social media service.

A social media service may generally include any type or form of social media platform, or collection of social media platforms, provided via server 106 to enable digital social networking. In some examples, a social media service may include a variety of different platforms (e.g., frameworks) for the users within its network. For example, a social media service may provide one or more status-broadcasting platforms, such as a newsfeed platform and/or a stories platform, that enables users to broadcast, consume, and/or digitally respond to user-generated compositions. Additionally or alternatively, a social media service may provide a messaging platform that enables users to send private messages and/or a trail platform 107 that enables the creation and sharing of linearly linked group compositions.

In some examples, a newsfeed platform may provide users with a newsfeed and/or enable users to create and/or post newsfeed compositions. The term "newsfeed" may generally refer to any type or form of social media consumption channel that presents a scrollable collection of newsfeed compositions. In some examples, a newsfeed may scroll (e.g., upward and/or downward) to reveal different newsfeed compositions posted to the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or reference-based compositions (e.g., with a link to an online article). In some examples, as will be described in greater detail below, a digital trail (e.g., digital trail 119) may be posted as a newsfeed composition.

In some embodiments, a stories platform may provide users with a story-feed and/or enable users to create and/or post story compositions. The term "story-feed" may generally refer to any type or form of social media consumption channel that presents a continuous series of digital story compositions to a story-consumer, one by one. In one example, the story consumption channel may transition from presenting one digital story composition to the next automatically, without requiring any user input to do so. In some examples, a digital story composition may be ephemeral (that is, the digital story composition may only be viewable for a predetermined amount of time). For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and posted by a same user) may be grouped together within the story consumption channel, such that each digital story composition from a particular source is displayed prior to displaying digital story compositions from another source.

Trail platform 107 generally represents any type or form of digital framework that enables the creation and consumption of digital trails. The term "digital trail" may refer to a stream of thematically related media recordings. Each media recording within a digital trail may be created and added to the digital trail by a different user but may be subject to the same set of creative constraints. For example, each media recording may be of the same type (e.g., each recording may be a video recording and/or each recording may be an audio recording). Additionally, each media recording may be subject to a same digital transformation (e.g., a same visual filter, a same speed setting, a same mixed reality element, etc.).

In some examples, the order of the media recordings within a digital trail may be chronologically determined based on the order in which the media recordings were added to the trail, with earlier-added media recordings being positioned before later-added media recordings within the trail. Additionally or alternatively, the recordings within a digital trail may be sequence-dependent. For example, each recording may represent a predetermined segment of a digital work (e.g., each recording may represent a different portion of a song). As another example, each recording following an initial recording may respond to the recording that immediately precedes it within the trail (e.g., following a call-and-response format). In some examples, each recording within a trail may respond to a trigger recording or prompt. For example, an initial recording (e.g., a trigger recording) and/or prompt may pose a question or make a request for each subsequent recording to respond to.

Trail platform 107 may enable three stages for a particular trail: an initiation stage, in which the trail is initiated by a trail-initiator user (i.e., a "trail-blazer") via a trail-initiation interface, a collection stage, in which media recordings are collected to add to the trail (e.g., from the trail-initiator user and/or one or more additional users invited to contribute to the trail), and a consumption stage, in which the resulting trail is shared to one or more users of a social media service for user consumption (e.g., via trail platform 107 and/or a status-broadcasting platform of the social media service). The initiation stage may include (1) the selection of a trail mode for the trail, (2) the selection of one or more creative constraints and/or transformations to be applied to each media recording added to the digital trail, and/or (3) the creation of an initial media recording for the trail. The initiation stage may also include the configuration of a composition-creation interface, to be used to create media recordings to be added to the trail, that is specific to the selected trail mode (e.g., that only enables the creation of a type of media recording that corresponds to the selected trail mode and/or that conveys and/or applies selected creative constraints and/or transformations). Next, in the collection stage, trail platform 107 may provide the composition-creation interface to devices of contributor users and collect media recordings created in response. Finally, in the consumption stage, the media recordings added to the trail may be displayed in the order in which they were collected. The relationship between the collection stage and the consumption stage may be cyclic, with the display continually being updated to include new media recordings as they collected.

In some examples, a digital trail may be non-ephemeral (i.e., with no platform-imposed expiration period) and evergreen (i.e., may be open to receiving new recordings to be added to the trail as long as the trail has not been removed from the social media service and/or trail platform 107). In some examples, contributors to a digital trail may have varying rights of removal. For example, a trail-initiator user may have a right to remove an entire digital trail and each contributor to the trail may have only a right to remove a recording added to the digital trail by that contributor. Similarly, trail platform 107 may enable a user to share (e.g., via status-broadcasting platform) an entire digital trail or to share an individual recording from within a digital trail.

Figure 2:
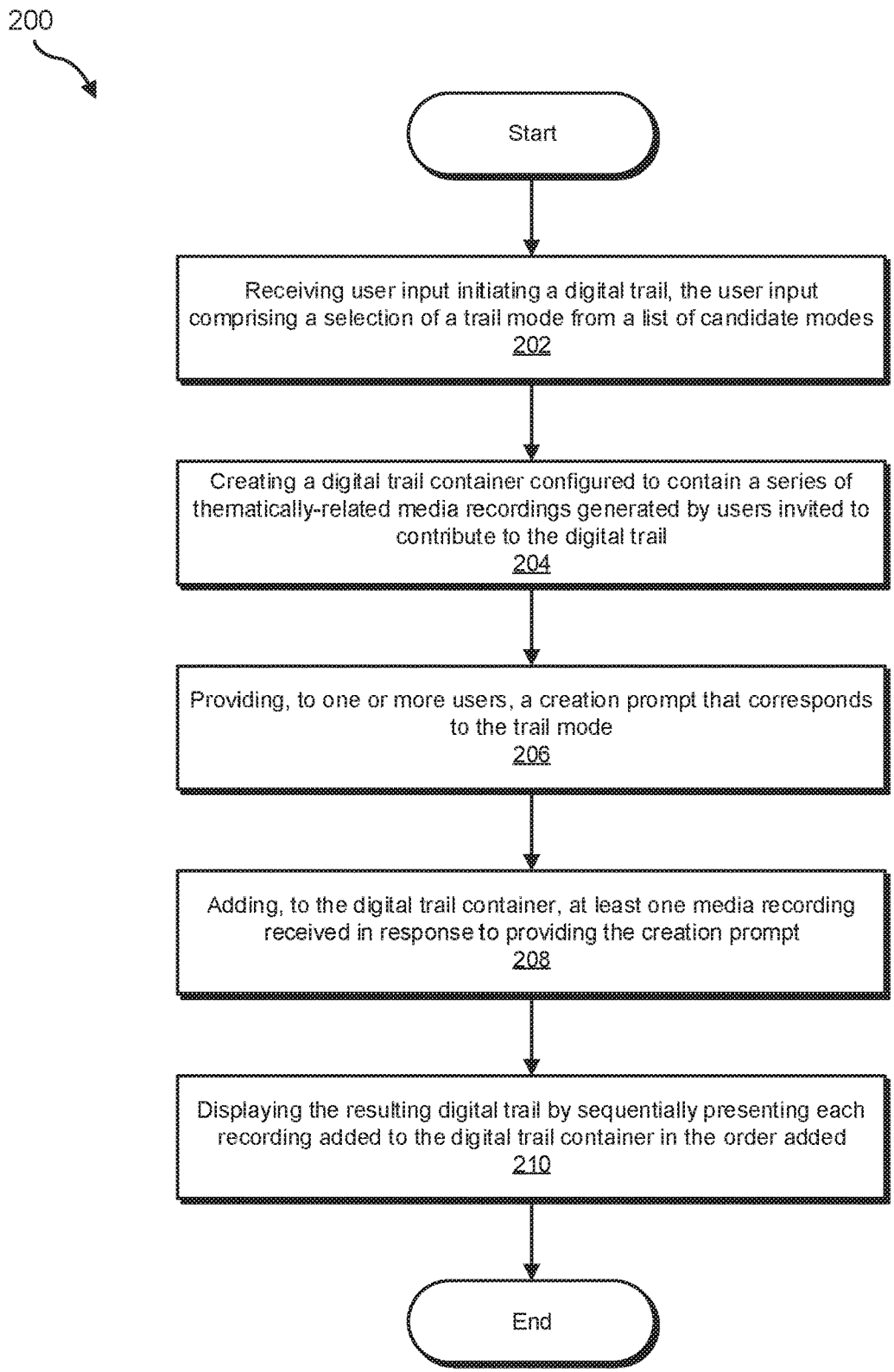
FIG. 2 is a flow diagram of an exemplary method for generating and broadcasting digital trails of recorded media.

FIG. 2 is a flow diagram of an exemplary method 200 for generating and broadcasting digital trails of media recordings. As illustrated in FIG. 2, at step 202, one or more of the systems described herein may receive user input initiating a digital trail, the user input including a selection of a trail mode from a list of candidate modes in response to receiving the user input. For example, receiving module 108 may, as part of server 106 in FIG. 2, receive user input 118 initiating digital trail 119, user input 118 including a selection of trail mode 117 from list of candidate modes 115.

Receiving module 108 may receive the user input in a variety of ways and/or contexts. For example, receiving module 108 may be part of a social media platform and may receive the user input from a user account of the social media platform. Additionally or alternatively, receiving module 108 may be part of a trail-specific application that primarily generates and/or displays digital trails.

The term "trail mode" may generally refer to any one or more constraints placed on digital recordings added to a trail and/or transformations applied to the digital recordings added to a trail. For example, a trail mode may specify that only media recordings of a certain type, such as audio, videos with audio, videos, and/or animations, may be added to a trail. In another example, a trail mode may specify that compositions added to a trail include content of a user performing certain actions, such as singing a song, uttering words, and/or dancing. In one embodiment, a trail mode may specify a minimum and/or maximum length of recordings added to a trail and/or an exact length of recordings added to the trail.

In some examples, a trail mode may enable a user to select one or more digital transformations to be applied to each recording added to a trail, such as making videos black and white, applying a filter to animations, audio, and/or video, adding an augmented reality element to videos, and/or increasing or decreasing the speed of animations or videos. In these examples, which digital transformations are available for selection may depend on the trail mode selected by the user. Additionally or alternatively, one or more digital transformations may be automatically selected for particular modes.

In some embodiments, a trail mode may enable a user to specify a prompt that suggests creative constraints and/or content for recordings added to a trail by additional users invited to contribute to a trail. For example, a trail mode may enable a trail-initiator user to specify a series of words to be included (e.g., uttered) in recordings added to the trail. In some examples, a trail mode may include multiple constraints and/or transformations. For example, a trail mode may specify that compositions added to the trail be black-and-white videos of users singing a ten-second-long portion of a song chosen by a trail-initiator user.

In some embodiments, the user input may additionally include permissions information about users who are permitted and/or invited to contribute to the trail. In some embodiments, the systems described herein may display permissions options that include an option to permit a preexisting list of users to add recordings to the digital trail (e.g., a user's friends list, members of a group of users, etc.), an option to create a new list of users permitted to add recordings to the digital trail, and/or an option to permit all users (e.g., all users with an account on a social media platform of a social media service) to add recordings to the digital trail. Additionally or alternatively, the user input may include a selection of a discoverability option. For example, the systems described herein may enable a trail-initiator user to select whether a trail is visible to all users who have permission to add recordings to the trail, all users who receive a link and/or invitation to view the trail (regardless of editing permissions), and/or all users (e.g., via a global trail browsing interface).

At step 204, one or more of the systems described herein may create a digital trail container configured to contain a series of thematically related media recordings generated by users invited to contribute to the digital trail. For example, creation module 110 may, as part of server 106 in FIG. 2, create digital trail container 120 configured to contain series of thematically related media recordings 126 generated by users invited to contribute to digital trail 119.

Creation module 110 may create the digital trail container in response to a variety of triggers. For example, creation module 110 may create the digital trail container in response to receiving the selection of the trail mode. Additionally or alternatively, creation module 110 may create the digital trail container in response to receiving a media recording to be added to the trail from a trail-initiator user. In some examples, creation module 110 may continue to maintain the digital container non-ephemerally (i.e., with no automatic expiration date), deleting the digital container only in response to receiving user input selecting to delete the digital trail.

The term "media recording" may generally refer to any audio and/or video recording created by a user. In some embodiments, a media recording may be created via the camera and/or microphone of a user device such as a mobile phone, tablet, or laptop. In some embodiments, a trail may be configured to only accept user-generated media recordings that are recorded by a user via a trail interface (e.g., a trail creation interface), as opposed to pre-existing media not recorded by the user and/or not created via the trail interface. In some examples, the media recordings added to a trail may be thematically related media recordings that all follow similar constraints, contain similar content, and/or are otherwise related by theme.

At step 206, one or more of the systems described herein may provide, to one or more users, a creation prompt that corresponds to the trail mode. For example, prompt module 112 may, as part of server 106 in FIG. 2, provide, to one or more users, prompt 122 that corresponds to trail mode 117.

Prompt module 112 may provide the creation prompt in a variety of ways and/or contexts. For example, prompt module 112 may provide the creation prompt via a trail interface that enables a user to create a media recording in response to the prompt. In some embodiments, the systems described herein may display the media recordings currently in the trail and may then display the prompt after displaying some or all of the media recordings. Additionally or alternatively, the prompt may be presented persistently, as the current media recordings are displayed. Prompt module 112 may provide the creation prompt to a variety of users. For example, prompt module 112 may provide the creation prompt to a user initiating the digital trail as part of a trail initiation process and/or to a user consuming the digital trail (e.g., immediately after sequentially presenting, as part of a trail consumption process, each media recording already added to the digital trail container in the order added). Additionally or alternatively, prompt module 112 may transmit the creation prompt (e.g., within a message and/or notification) to one or more users invited to contribute to the digital trail (e.g., users indicated by a privacy setting selected during a trail initiation stage). In some examples, prompt module 112 may transmit the creation prompt as a newsfeed post within a newsfeed, within a private message (e.g., within an email and/or text message), and/or as a digital story within a story-feed.

The term "creation prompt" or "prompt," as used herein, may generally refer to any information and/or cues presented to a user via a display element of a user device. In some embodiments, a prompt may include text with suggestions about constraints and/or content to be included in a media recording, such as song lyrics, a list of suggested words, written dialogue, a question to answer, and/or a topic to discuss. Additionally or alternatively, a prompt may include media and/or references to media, such as a list of songs, audio of a song, and/or an animation that highlights each word of a song lyric at the time when the word is expected to be sung. In some embodiments, a prompt may include one or more songs from a predetermined catalogue of songs and/or words from a predetermined list of words that may be selected via user input for inclusion in a media recording. The creation prompt may take a variety of forms. In some examples, the creation prompt may take the form of a selectable reply element (see, e.g., the add-reply button 408 depicted in FIG. 4 and/or the terminal reply-tile depicted in FIG. 6). Additionally or alternatively, the creation prompt may include a text-based instruction and/or invitation and/or be provided alongside a text-based instruction and/or invitation (e.g., included within a private message and/or notification).

In some examples, prompt module 112 may solicit additional compositions for the digital trail (passively and/or actively) indefinitely (i.e., there may be no policy dictating an automatic deadline for contribution). In certain examples, the systems disclosed herein may not enable commenting (e.g., via a comments section and/or emoji-selection) for the digital trail, such that the only way for a viewer of the digital trail to digitally respond to the digital trail is to digitally add a composition to the digital trail.

After presenting the creation prompt, prompt module 112 may receive user input provided to creation prompt initiating the creation of the media recording for the digital trail. In response to receiving the additional user input, a creation module may provide a creation interface for recording a new media recording to be added to the digital trail. The creation interface may generally represent any type or form of trail-composition interface that enables the creation of a composition to be added to an existing digital trail. In some examples, the creation interface may represent a composition-consumption interface that both presents a digital trail and enables the composition of media compositions to be added to the presented digital trail. In some examples, the creation interface may include the creation prompt and/or some or all of the content described above in connection with the creation prompt.

Prior to providing the creation interface, the creation module may select and/or configure the creation interface to correspond to the trail mode selected during the trail initiation stage. For example, the creation module may select and/or configure a creation interface that enables only the creation of a particular type of media composition that corresponds to the selected trail mode (e.g., a creation interface with an element to start recording a video and/or a creation interface with an element to start recording audio). In some examples, the creation interface may include content that coincides with a prompt and/or theme selected by the trail-initiator user (e.g., lyrics to a song selected by the trail-initiator user to be sung in a recording). In examples in which the trail mode is a sequence-dependent trail mode, the creation interface may be configured to include content that is based on content detected from a previous recording within the digital trail. After providing the creation interface, the creation module may receive one or more media compositions created via the creation interface by one or more users.

At step 208, one or more of the systems described herein may add, to the digital trail container, at least one media recording received in response to providing the creation prompt. For example, adding module 114 may, as part of server 106 in FIG. 2, add, to digital trail container 120, recording 124 received in response to providing prompt 122.

Adding module 114 may add the media recording in a variety of ways and/or contexts. For example, the systems described herein may enable a user to create a media recording via a trail interface (e.g., the creation interface described in connection with step 206) and may automatically add the media recording once completed. Additionally or alternatively, adding module 114 may enable a user to upload a media recording created via another application.

In some embodiments, adding module 114 may perform a digital transformation (e.g., a transformation specified during a trail's initiation and/or a transformation that is inherent to the trail's mode) to each media recording added to the digital trail container. For example, adding module 114 may apply a filter, speed up or slow down a recording, add an augmented reality element to a recording, crop or resize a video, autotune audio, and/or perform any other relevant digital transformation. In these embodiments, the transformation may be automatically performed for each media recording added to the digital trail container.

As will be discussed in greater detail below, some trails may be sequence-dependent, with each recording within a trail configured to respond to the recording immediately preceding it within the trail. In such trails, adding two recordings in tandem (i.e., responding to the same previous recording) may be problematic. Thus, the systems described herein may include one or more mechanisms for dealing with (e.g., preventing) duplicate responses to a particular recording. In one embodiment, prompt module 112 may display (at step 206) a creation prompt for a digital trail within multiple interfaces, each being displayed to a different user. But, once the creation prompt is selected (i.e., a creation process has been initiated) via one of the interfaces, the creation prompt (and/or a reply element within the creation prompt) may be removed from all of the other interfaces. If the creation process is aborted, the creation prompt (and/or the reply element within the creation prompt) may reappear in the other interfaces. If the creation process is completed, the media recording created via the creation process may be added to the digital trail container and a creation prompt (and/or a reply element) may reappear in the other interfaces but may be configured to create a media recording to be added after the media recording just added.

Additionally or alternatively, if a second user selects a creation prompt (and/or a reply element within the creation prompt) to add a media recording while a first user is in the process of creating a media recording, the systems described herein may display an error message to the second user (e.g., a notification that another recording is in progress) without enabling the second user to begin a recording process until the other recording is completed. In some embodiments, if two or more users begin to create media recordings in response to the same recording at the same time, each of the users may be enabled to begin a recording process but only the first recording finished may be added to the digital trail container, with subsequent users being sent an error message upon completing their recordings and/or upon the completion of the first recording (e.g., a notification that another recording has been added and/or prompting the user to create a media recording in response to the other recording).

Additionally or alternatively, the systems described herein may add multiple recordings created in response to the same previous recording to the digital trail container. In some embodiments, the systems described herein may enable a trail initiator to delete recordings, such as redundant recordings that respond to the same media recording.

At step 210, one or more of the systems described herein may display the resulting digital trail by sequentially presenting each media recording added to the digital trail container in the order added. For example, display module 116 may, as part of server 106 in FIG. 2, display digital trail 119 by sequentially presenting each media recording added to digital trail container 120 in the order added. In some examples, display module 116 may auto-advance from one media composition to the next (e.g., similar to a slideshow format).

Display module 116 may display the digital trail to a variety of users. For example, display module 116 may display the digital trail only to users who are permitted to add media recordings to the digital trail. Additionally or alternatively, display module 116 may display the digital trail to users who are not permitted to add media recordings but are permitted to view the digital trail (e.g., based on a privacy setting selected by the trail-initiator user).

Display module 116 may display the digital trail in a variety of contexts. In some examples, display module 116 may display the digital trail within a consumption channel of a platform provided by a social media service (e.g., via a social media consumption interface). For example, display module 116 may display the digital trail as a newsfeed composition within a newsfeed provided by a newsfeed platform, as a digital story within a story-feed provided by a stories platform, within a private message sent via a messaging platform, and/or within a dedicated trail-consumption channel (e.g., a dedicated trail-consumption interface) provided via a dedicated trail platform. In these examples, a user sharing the digital trail may either share an entire trail and/or may share an individual composition (i.e., recording) from a trail. In examples in which a user shares an individual composition from a trail, a social media platform may either present the individual composition in isolation or, after presenting (e.g., playing) the individual composition, may begin auto-advancing to the subsequent media compositions within the trail.

In some examples, display module 116 may additionally provide, within a social media consumption interface used to display the digital trail, a scrollable progress bar. The scrollable progress bar may indicate, for a media composition (i.e., a media recording) currently being presented, both (1) the media composition's position within the digital trail and (2) a temporal progress of the media composition.

In these examples, the progress bar may be sequentially divided into multiple sub-portions, the number of sub-portions corresponding to the number of media compositions within the digital trail. Each sub-portion may be of a set length. In some examples, this set length may be uniform (i.e., the same for each sub-portion). Additionally, each sub-portion may correspond to one of the media compositions within the digital trail, where the first sub-portion corresponds to the first media composition within the digital trail, the second sub-portion corresponds to the second media composition, the third sub-portion corresponds to the third media composition, and so on. When a particular media composition is being presented, a demarcation (e.g., a bolded and/or colored appearance) may begin to fill the sub-portion corresponding to the particular media composition. A percentage of the sub-portion's length that is demarked may correspond to a percentage of media composition that has been presented. Once the presentation of the media composition is complete, a subsequent media composition may begin to be presented and the demarcation may reset (i.e., may clear from the sub-portion and may begin to fill the subsequent sub-portion of the progress bar), such that at any given moment, only one of the sub-portions of the progress bar may be filled or partially filled.

Figure 3:
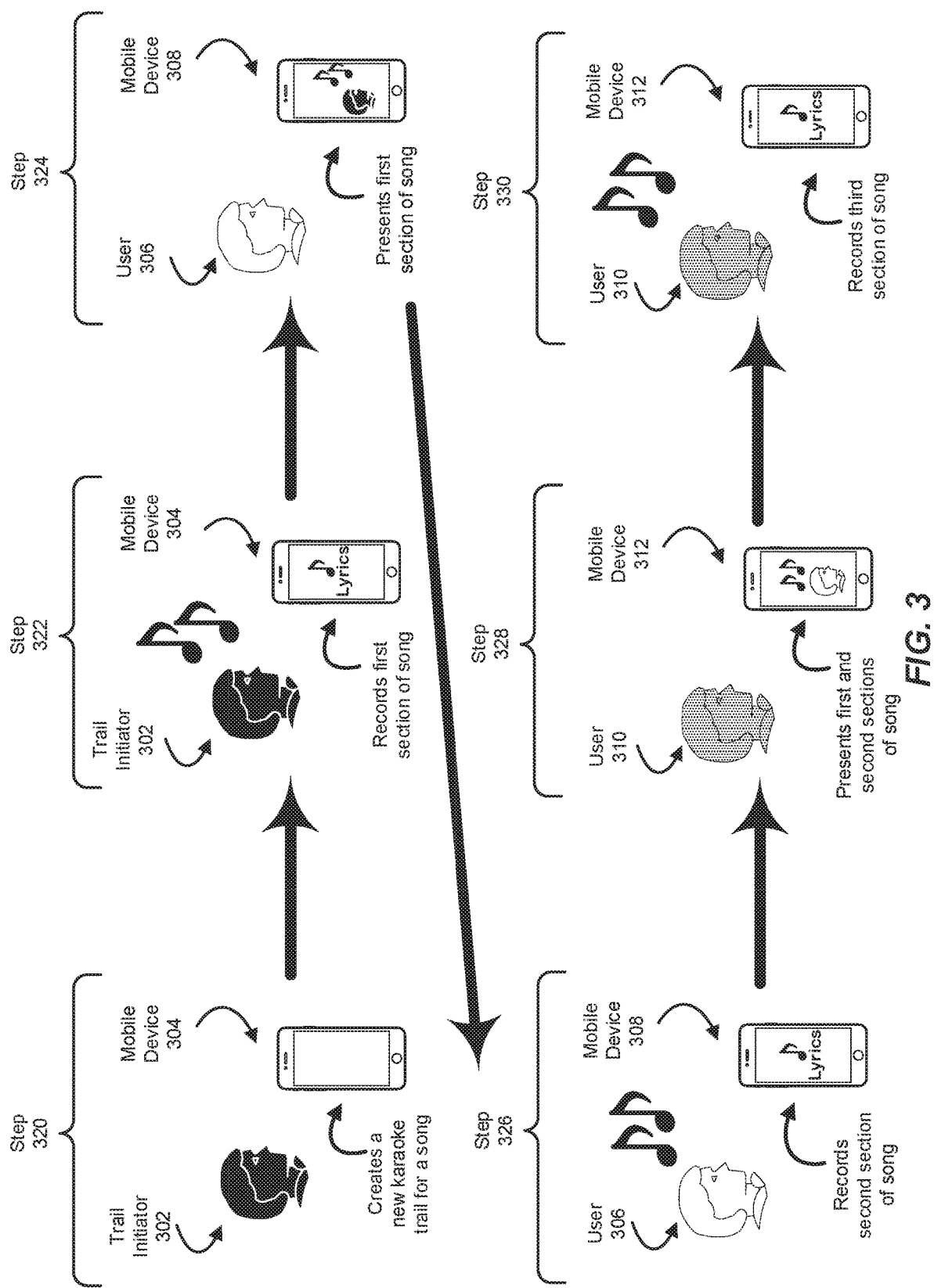
FIG. 3 is an illustration of an exemplary method for creating a karaoke trail.

The steps described above may be implemented in connection with a variety of different trail modes. While the ensuing discussion focuses on one trail mode at a time, the content discussed for one mode may be applicable each of the other modes as well. In some embodiments, the systems described herein may include a segmented-creation mode that facilitates the creation of a segmented trail in which each media recording includes a different sequential segment of a dialogue, a song, and/or a choreography. In one such example, the systems described herein may facilitate the creation of a karaoke trail that includes different users each singing different sequential segments or sections of a song. FIG. 3 illustrates an example method for creating a karaoke trail. At step 320, the systems described here may receive user input from a trail initiator 302 (e.g., a first user), via a mobile device 304, creating (i.e., initiating) a new karaoke trail for a song. Although illustrated as a mobile phone, mobile device 304 may broadly represent any personal mobile device including tablets, laptops, and/or smart accessories.

The systems described herein may enable the user's creation (i.e., initiation) of the new karaoke trail in a variety of ways. In some embodiments, the systems described herein may display a trail creation interface via an app on mobile device 304, such as a trail app, which may represent either a standalone trail application, a social media application, and/or an application that operates as part of a collection of social media services provided by a social media platform. In some examples, the trail creation interface may enable trail initiator 302 to select a trail mode, such as karaoke mode, from a list of available trail modes presented within the trail creation interface. In response to receiving the selection of the karaoke mode, the systems described herein may then present an interface specific to the karaoke mode that enables trail initiator 302 to specify a song. In some embodiments, the interface may present a list of songs that may be selected via user input. Additionally or alternatively, the systems described herein may enable trail initiator 302 to upload a recording of a song, input a link to an external recording of a song (e.g., on a social media platform that is unrelated to the trail platform), and/or otherwise provide a song. Once the systems described herein have received the user input initiating the new karaoke trail, the systems may create a digital container for the initiated karaoke trail.

In some examples, at step 322, a trail media recording interface may, via mobile device 304, prompt trail initiator 302 to perform the first section of the specified song and record trail initiator 302 performing the first section of the song. In some embodiments, the systems described herein may display the lyrics of the song (e.g., within the trail media recording interface). Additionally or alternatively, the systems described herein may play audio of instrumental music corresponding to the segment of the song (e.g., as corresponding lyrics are displayed). In some examples, the systems described herein may display an animation that emphasizes each word within the lyrics at the time at which the word is expected to be sung (e.g., in relation to currently playing audio). For example, the word may be bolded, highlighted, a different color, and/or indicated by an effect such as a bouncing dot. In some examples, the systems described herein may record audio of trail initiator 302 singing the first segment of the song (e.g., via a microphone of mobile device 304). Additionally, in some examples the systems described herein may record video of trail initiator 302 singing the song (e.g., using a camera and microphone of mobile device 304).

In some embodiments, the systems described herein may apply a digital transformation to the video of trail initiator 302 singing the song, such as rendering the video in black and white and/or applying a filter. In some examples, the trail creation interface may have enabled trail initiator 302 to select the digital transformation when initiating the trail and/or the digital transformation may be applied to all videos added to the trail. While FIG. 3 illustrates the first section of the song as being recorded by (and received from) trail initiator 302, in some examples the user who is enabled to record the first section, and from whom the first section of the song is received, may represent a user other than trail initiator 302. In some embodiments, the systems described herein may add the recording to a digital trail container for the trail.

At step 324, a trail platform and/or application may present, to a user 306 (e.g., a second user), the recording of trail initiator 302 singing the first section of the song via a mobile device 308. In some embodiments, the systems described herein may display, via a trail consumption interface provided by a trail app on mobile device 308, the first segment of the song, and may then transition into enabling user 306 to record a segment of the song, either within a portion of the trail consumption interface or within an additional creation interface. At step 326, the systems described herein may prompt user 306 to perform the second section of the specified song and receive a recording of user 306, created via the trail app on mobile device 308, singing the second section of the song. Then, the systems described herein may add this recording to the digital trail container for the trail.

In some embodiments, the systems described herein may divide the song into sections of similar length (e.g., two lines each, half a verse each, ten seconds each, etc.) to present sequentially to users. Additionally or alternatively, the systems described herein may detect the length of the recording created by each user to calculate the starting point of the next song section to present to the next user.

At step 328, the systems described herein may, via a trail app on a mobile device 312, present the first and second sections of the song, recorded by trail initiator 302 and user 306 respectively, to a user 310 (e.g., a third user). In some examples, the systems described herein may present the sections of the song in the order that the sections were added to the digital container (e.g., via a trail interface that is designed to present media recordings in the order that the media recordings were created). At step 330, a trail media recording interface may, via mobile device 312, prompt user 310 to sing the third section of the specified song, record user 310 singing the third section, and add the recording to the digital trail container. Following step 330, the trail platform and/or application may, in some examples, enable trail initiator 302, user 306, user 310, and/or an additional user to then view the first three sections of the song and/or record an additional section. In some examples, the systems described herein may enable and/or allow users to continue recording song segments until the entire song has been recorded. In some embodiments, the trail interface may be configured such that each user may only record one section of the song. Alternatively, the trail interface may be configured such that any user may record more than one section of the song. In some embodiments, the trail interface may be configured such that no user can record immediately adjacent sections of the song.

In the embodiment described in connection with FIG. 3, each segment of the song is recorded sequentially, and recordings of segments are added to the trail in the order recorded. In other embodiments, an order of segments may be determined prior to receiving user recordings of the segments. In one such embodiment, a set of users may be invited to contribute to the karaoke trail and each invited user may receive (e.g., in parallel) a prompt to record a segment assigned to the user. Then, the systems described herein may order the segments based on the previously determined order (e.g., releasing the karaoke trail for consumption only after a recording of each segment is received). In these embodiments, the order of the segments within the trail may not depend on the order of recording.

Figure 4:
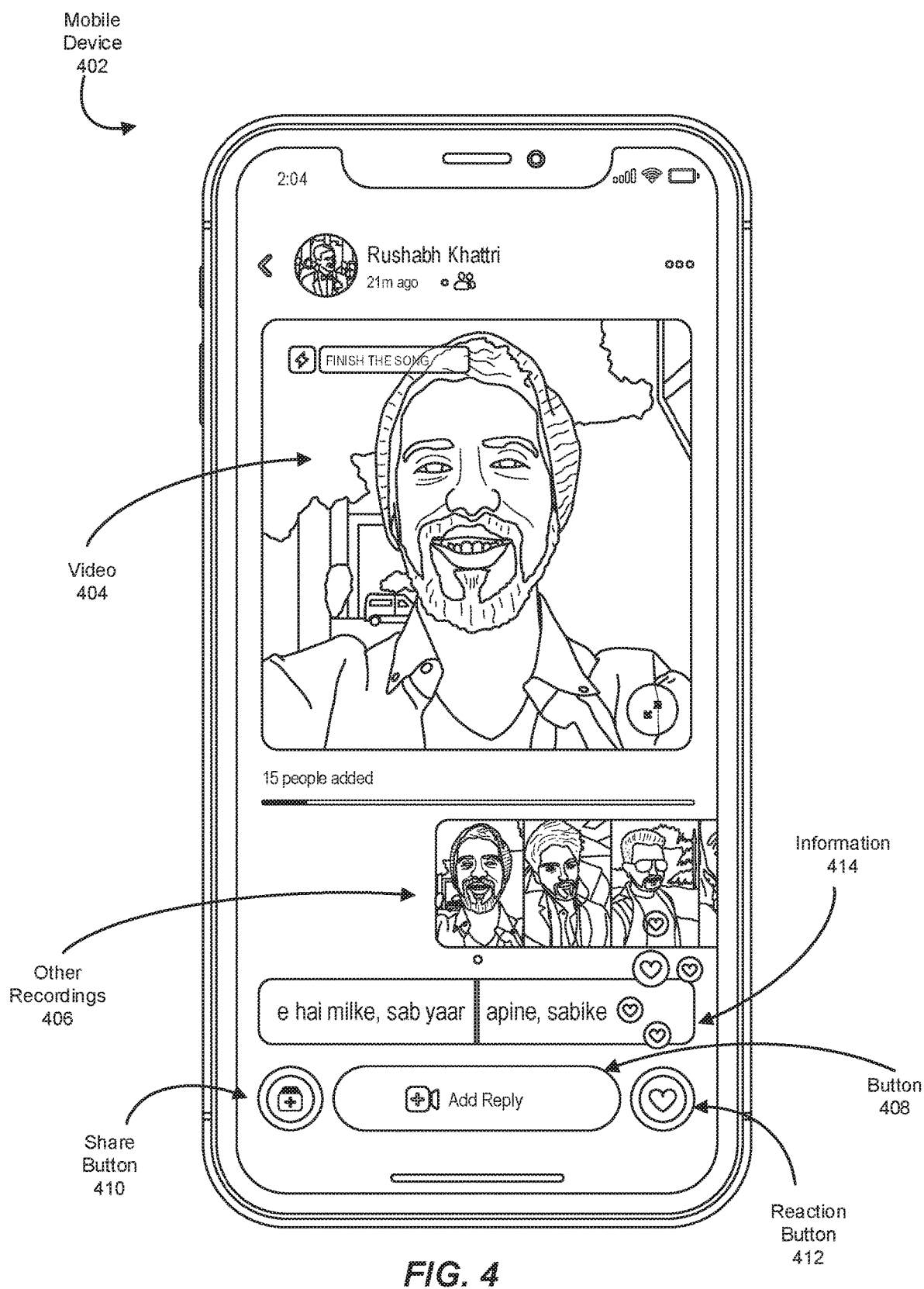
FIG. 4 is an illustration of an exemplary user interface for creating a karaoke trail.

As mentioned above, in some embodiments, the systems described herein may present a media recording and/or various information about a media recording for a karaoke trail via a user interface in a trail app. For example, as illustrated in FIG. 4, the systems described herein may display, via a mobile device 402, a video 404 of a user performing part of a song within a karaoke trail. In some embodiments, the systems described herein may enable a user to view video 404 in a full screen format (not illustrated).

In one embodiment, the systems described herein may additionally display information 414 about the karaoke trail alongside video 404. For example, information 414 may include the lyrics of the portion of the song being sung in video 404, as shown in FIG. 4. In some embodiments, the systems described may display a strip of thumbnails and/or links to other recordings 406 within the trail. The strip may enable a user to view past/upcoming recordings and/or to navigate between recordings that are part of the same karaoke trail (e.g., by navigating to a composition corresponding to a thumbnail selected via user input). In some examples, other recordings 406 may be organized in a set order (e.g., the order in which the recordings were added).

In one example, the systems described herein may be configured to auto-advance between other recordings 406 in the set order but may also enable a user to navigate between other recordings 406 in any order.

In embodiments in which video 404 is displayed to a user who is eligible to add an additional media recording to the trail, the display of other recordings 406 may include an interface element that launches a media recording interface that enables a viewer to create a media recording of the next section of the song. In some embodiments, the launching element may take the form of, or be included as part of, a final thumbnail within the strip of thumbnails (as illustrated for the antakshari mode in FIG. 6). Additionally or alternatively, the launching element may represent an element, such as button 408 in FIG. 4, that is persistently presented as each of the other recordings 406 are played. In some embodiments, the systems described herein may display a share button 410 that enables the user to share the trail and/or an individual media recording from within the trail and/or a reaction button 412 that enables the user to add a reaction (e.g., like, love, etc.) to the trail and/or the media recording currently presented (e.g., video 404).

Although described in terms of karaoke, the systems described herein may facilitate the creation of other similar trails where multiple users sing, recite dialogue, and/or perform scripted motions in order to create or recreate a performance. For example, the systems described herein may facilitate the creation of movie scene trails where the trail creation interface enables a trail initiator to select a scene from a movie and the trail media recording interface presents users with a creation prompt that includes dialogue and/or blocking directions from the movie script. In another example, the trail creation interface may enable a trail initiator to select a dance (e.g., by selecting a song associated with the dance) and the trail media recording interface may record videos without audio that show the users performing specified dance movies. In one example, the systems described herein may later add audio to silent videos, for example by adding audio of the song to which the users are dancing.

Moving on from a karaoke mode, in some embodiments, a trail mode may promote, for each media recording added to a digital trail container after an initial media recording, a specified relationship between the media recording and a previous media recording that immediately precedes the media recording within the digital trail. For example, a trail mode may promote a relationship between media recordings in which the first utterance (e.g., word and/or consonant) uttered in each media recording following the initial media recording may be the same utterance as the last utterance (e.g., word and/or consonant) uttered in the previous media recording. In one such example, an antakshari mode may facilitate the creation of an antakshari trail that includes media recordings of different users, each singing a section of a song beginning with the utterance (e.g., word and/or consonant) that the song (and/or section of song) in the previous media recording ended on. Additionally or alternatively, an antakshari trail may include media recordings in which each media recording, following the initial media recording, is of a user singing a song and/or a section of a song that starts with or includes one or more words included in the lyrics of the song sung in the previous media recording.

Figure 5:
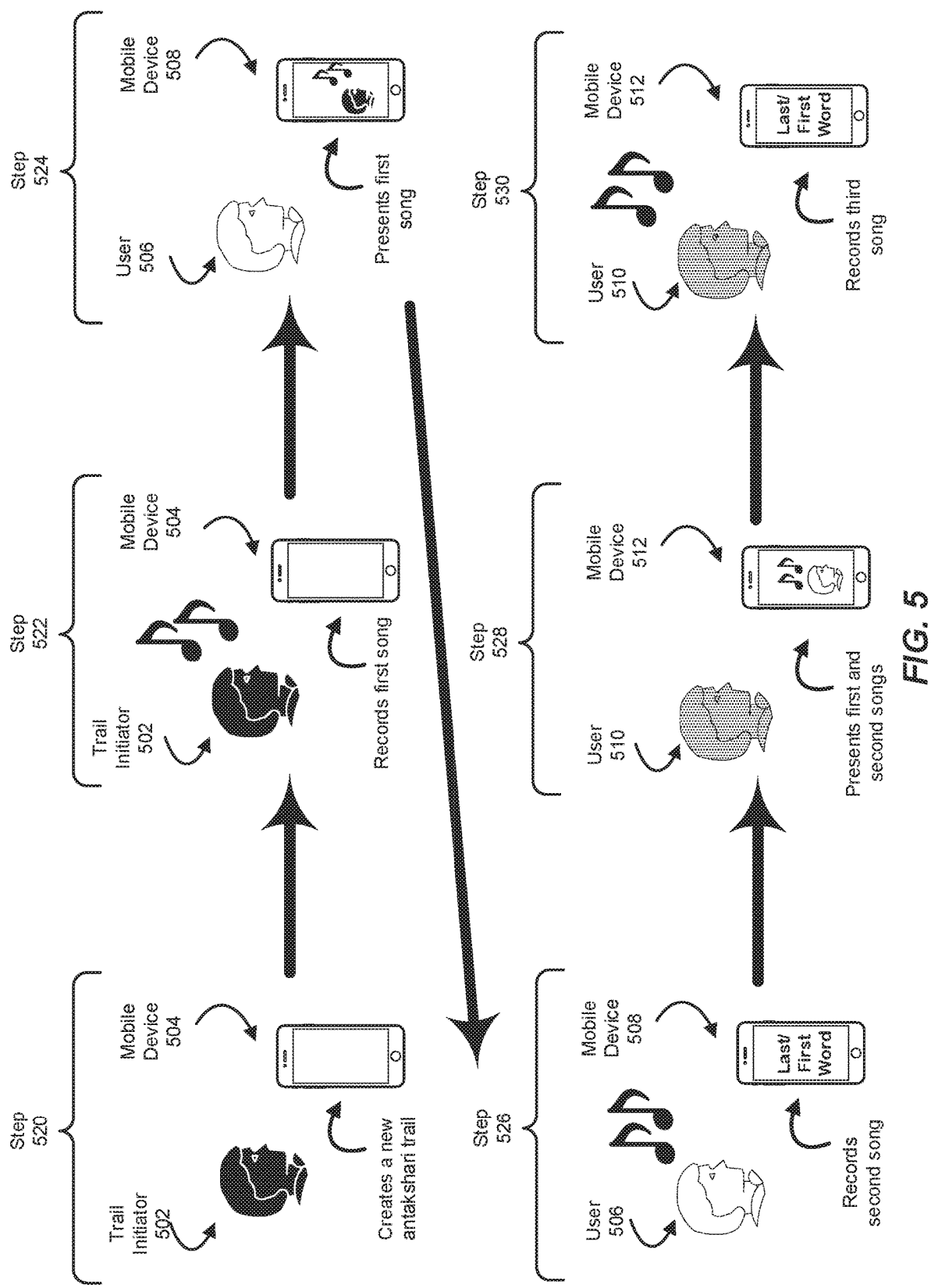
FIG. 5 is an illustration of an exemplary method for creating an antakshari trail.

FIG. 5 illustrates an example method for creating an antakshari trail. At step 520, a trail creation interface may, in response to receiving input from a trail initiator 502 via a mobile device 504 (e.g., via a trail app), create a new antakshari trail. In some examples, the systems described herein may create a digital trail container for the new antakshari trail in response to receiving user input that initiates the trail.

In some embodiments, the systems described herein may not require trail initiator 502 to specify a creation prompt after trail initiator 502 selects antakshari as the trail mode due to antakshari compositions each being based on the previous composition with no overarching content requirement or additional constraints. Additionally or alternatively, the systems described herein may enable and/or require trail initiator 502 to select a list of candidate songs for inclusion in the antakshari trail (e.g., via a portion of the trail creation interface specific to the antakshari mode). In some examples, the trail creation interface may enable trail initiator 502 to specify a digital transformation (e.g., filter) to be applied to each media recording added to the antakshari trail, a minimum and/or maximum length for each recording added to the antakshari trail, an audience for the antakshari trail, and/or other preferences for the antakshari trail.

At step 522, the trail media recording interface may, via a trail app on mobile device 504, record trail initiator 502 performing the first song of the antakshari trail (e.g., via a camera and/or microphone of mobile device 504). In some embodiments, the systems described herein may present a recording interface to record the performance of the first song without further prompts. Alternatively, the trail media recording interface may enable trail initiator 502 to select and/or supply a song (e.g., via a link, upload, etc.) and (e.g., upon receiving the selection) may present the lyrics of the song, instrumental audio of the song, and/or an animation showing when to sing which lyric of the song in conjunction with the audio. In some examples, the trail media recording interface may record audio of trail initiator 502. Additionally, the trail media recording interface may record video of trail initiator 502. In some embodiments, the systems described herein may add the recording of trail initiator 502 singing the song to the digital trail container.

In certain examples, the systems described herein may record a different user performing the first song after trail initiator 502 creates the trail (instead of receiving the recording of the first song from trail initiator 502). In some examples, the systems described herein may record users performing entire songs while in other examples, the systems described herein may record users performing sections or segments of songs. Where the term "song" is referred to in connection with an antakshari trail, it may generally refer to an entire song or a portion of a song.

Upon receiving the trail initiator's selection or supplying of the first song and/or upon receiving the recording of the first song, the systems described herein may select at least one word from the first song, to serve as a trigger word for the next media composition within the antakshari trail. In some examples, the last word of the first song may automatically be selected as the trigger word. In some such embodiments, the trail media recording interface may enable trail initiator 502 to input the last word of the song via text. Additionally or alternatively, the systems described herein may perform speech-to-text analysis to determine the last word of the song.

In some examples, one or more words from anywhere within the song may be selected. These words may be selected in a variety of ways. For example, the systems described herein may receive a selection of words from trail initiator 502. Additionally or alternatively, the systems described herein may parse the lyrics of the song to select the words. In these examples, the systems described herein may select the words based on a variety of criteria. For example, the systems described herein may search the lyrics for nouns or verbs that are repeated more than a certain number of times (e.g., twice, three times, etc.). As another example, the systems may be configured to select words based on the song options they may trigger for the next recording within the trail (i.e., songs that start with and/or include the word). For example, the systems may be configured to parse the lyrics for words that will trigger the largest number of subsequent song options and/or subsequent song options most likely to be selected by a subsequent user. This prediction may be tailored to a particular user or may be general. In some examples, the system described herein may rely on a machine learning system to select the words from the song.

At step 524, the systems described herein may present the media recording of the first song to a user 506 via a trail consumption interface of a trail app on a mobile device 508. In some embodiments, the systems described herein may display, via a trail consumption interface provided by the trail app on mobile device 508, the media recording of the first song and may then transition into enabling user 506 to record a second song, either within a portion of the trail consumption interface or within an additional creation interface. In some examples, the systems described herein may provide a reply element within the trail consumption interface that triggers this transition when selected via user input.

Then (e.g., in response to receiving user input from user 506 selecting a reply element), the systems described herein may record user 506 performing a second song via the trail app on mobile device 508 (step 526). In some embodiments, the systems described herein may display, via the consumption interface, creation interface and/or recording interface, the one or more words selected from the previous song that should be used as the first word of the song being recorded. In some embodiments, the recording interface may enable user 506 to record any song. Additionally or alternatively, the recording interface may present user 506 with a list of songs that begin with and/or include the one or more words selected from the previous songs. In these embodiments, the recording interface may facilitate a recording of the song selected by user 506 (e.g., by presenting the lyrics of the song, instrumental audio of the song, and/or an animation showing when to sing which lyric of the song in conjunction with the audio).

Upon recording user 506, the systems described herein may add the recording of user 506 to the digital trail container created for the antakshari trail.

At step 528, the systems described herein may, via a trail consumption interface of a trail app on a mobile device 512, present to a user 510 the first and second songs. In some embodiments, the trail app may present the first and second songs in the order in which the song sections were recorded. After transitioning to enabling user 510 to record a media recording, at step 530, the trail app on mobile device 512 may record user 510 performing a third song that begins with the word that ended the second song and/or includes one or more trigger words from the previous song and may add the recording to the digital trail container.

In some embodiments, similarly to the karaoke mode described above in connection with FIG. 3, the systems described herein may enable the same and/or additional users to continue adding songs to the antakshari trail. In some embodiments, an antakshari trail may not have any limit to the number of songs that may be added and/or any set expiration for contribution. Additionally or alternatively, the systems described herein and/or the trail initiator may configure the antakshari trail to stop accepting additional media recordings after a certain amount of time has passed since the creation of the trail (e.g., three days, one month, one year), after a certain amount of time has passed since the last recording was added, once a certain total recording time for the trail is reached (e.g., ten minutes, thirty minutes, an hour), and/or once a certain number of recordings are added (e.g., ten recordings, twenty recordings, fifty recordings).

Figure 6:
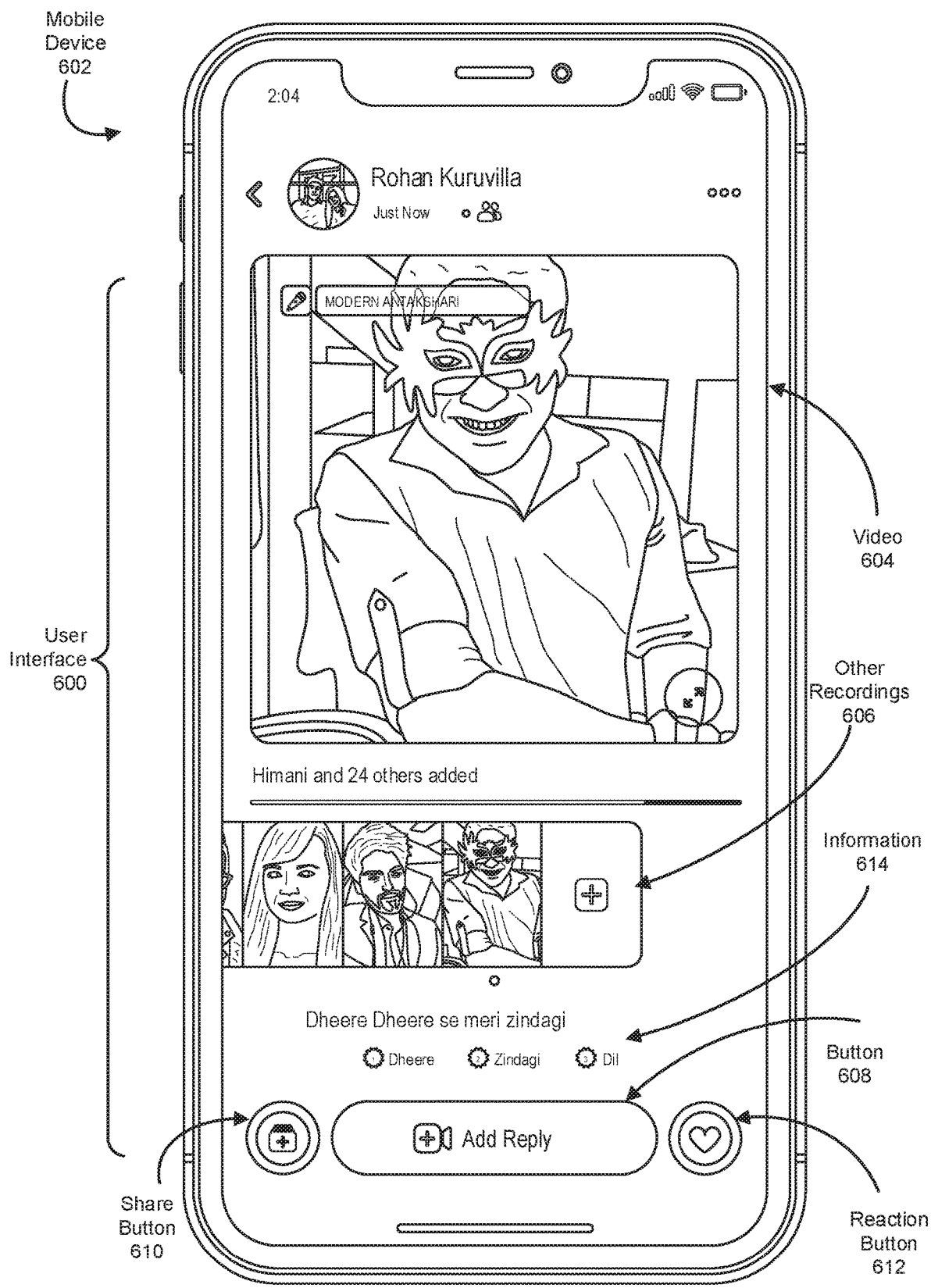
FIG. 6 is an illustration of an exemplary user interface for creating an antakshari trail.

As mentioned above in connection with FIG. 5, the systems described herein may present a media recording and/or various information about a media recording for the antakshari trail via a user interface (e.g., a user consumption interface) in a trail app. The user interface may take a variety of forms and may include a variety of content. For example, as illustrated in FIG. 6, the systems described herein may provide a user interface 600 that displays a video 604 of a user performing a song within an antakshari trail. As shown in FIG. 6, in some embodiments, the systems described may display, within user interface 600, a strip of thumbnails and/or links to other recordings 606 within the trail. The strip may enable a user to view past/upcoming recordings and/or to navigate between recordings that are part of the same antakshari trail (e.g., by navigating to a composition corresponding to a thumbnail selected via user input). In some examples, other recordings 606 may be organized in a set order (e.g., the order in which the recordings were added). In one example, the systems described herein may be configured to auto-advance between other recordings 606 in the set order but may also enable a user to navigate between other recordings 606 in any order.

In some embodiments, the systems described herein may display information 614 about the trail and/or video 604 within user interface 600 (e.g., alongside video 604). Information 614 may include a variety of content and/or elements. For example, information 614 may include a creation prompt. The creation prompt may include whole-trail content, which is the same for each recording added to the trail, and/or may include recording-specific content (e.g., an instruction that is specific to the next media recording to be added to the trail, such as a list of words to be included in a song). User interface 600 illustrates a creation prompt with recording-specific content (e.g., three words selected from the previous song, any of which may be selected as the first word in the next media recording).

In embodiments in which video 604 is displayed via the user account of a viewer who is eligible to add an additional media recording to the trail, user interface 600 may include (e.g., within the display of other recordings 606) an interface element that launches a media recording interface that enables the viewer to create a media recording of the next song within the antakshari trail. In some embodiments, the launching element may take the form of, or be included as part of, a final thumbnail within the strip of thumbnails. Additionally or alternatively, the launching element may represent an element, such as button 608, that is persistently presented as each of the other recordings 606 is played. Additionally or alternatively, the systems described herein may display a share button 610 within user interface 600 that enables the viewer to share the trail and/or an individual media recording from within the trail. In one embodiment, the systems described herein may display a reaction button 612 within user interface 600 that enables the viewer to add a reaction (e.g., like, love, etc.) to the trail and/or the media recording currently presented (e.g., video 604).

As another example of a trail mode that promotes a specified relationship between media recordings, in some embodiments, the systems described herein may provide a call-and-response mode that facilitates the creation of a call-and-response trail. The call-and-response trail may alternate between compositions from two or more users. In some examples, each recording, following an initial recording within a call-and-response trail, may (1) include a "call" (i.e., an instruction) for the next recording within the trail and (2) respond to the call of the previous recording within the trail. Additionally or alternatively, each recording may be based on a common theme and/or prompt (e.g., a prompt instructing a user to record a media composition that includes one or more specified words).

Figure 7:
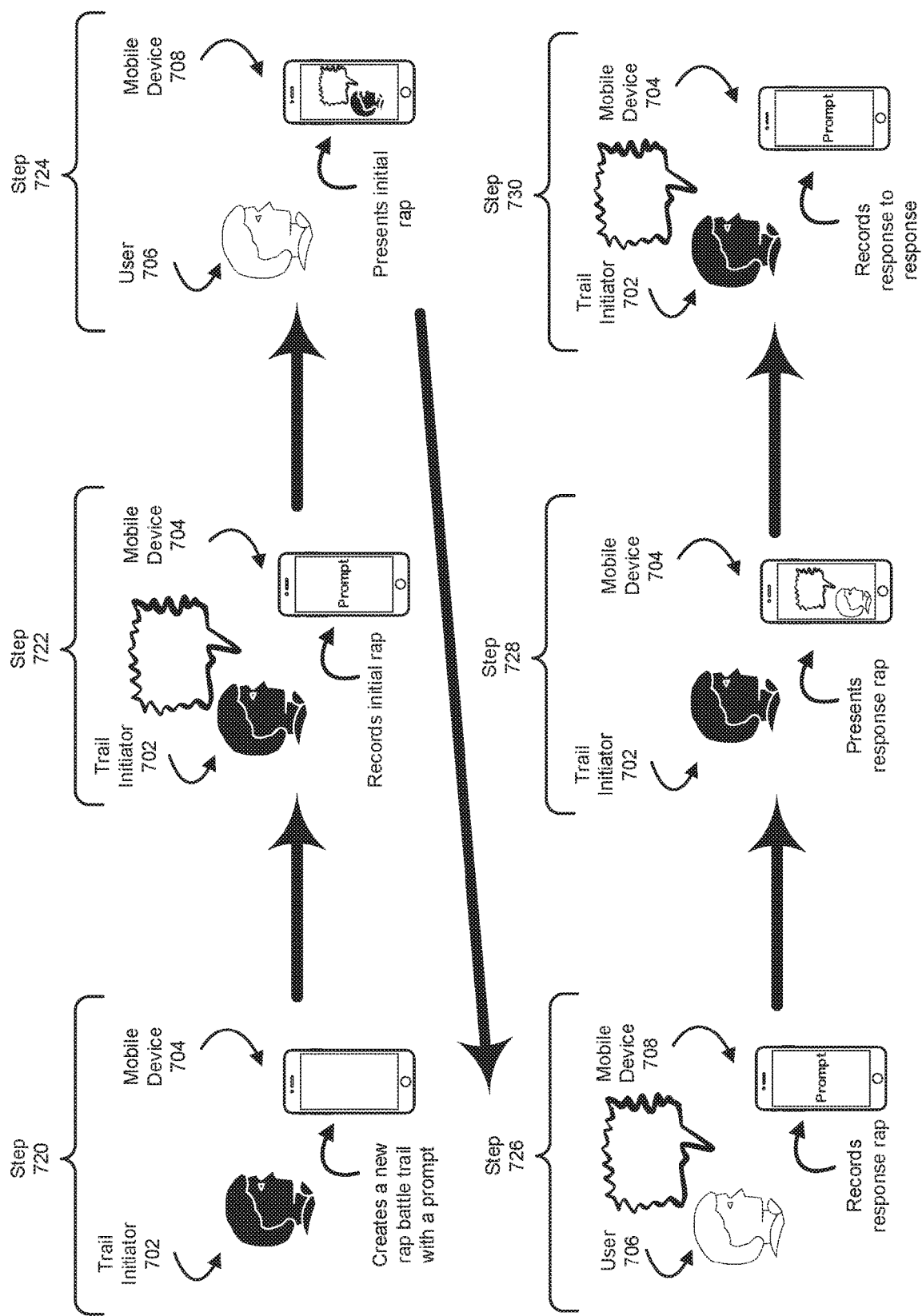
FIG. 7 is an illustration of an exemplary method for creating a rap battle trail.

An example of a call-and-response mode may include a rap battle mode for creating a trail configured to include media recordings of raps. In one example, the trail may be configured to alternate between media recordings from two or more different users. FIG. 7 illustrates an example method for creating a rap battle trail within a rap battle mode. At step 720, a trail creation interface may, in response to input from a trail initiator 702 via a mobile device 704 (e.g., via a trail creation interface), create a new rap battle trail (e.g., by creating a digital container for the new rap battle trail).

In some examples, the trail creation interface may enable trail initiator 702 to specify a prompt for the rap battle, such as a topic, a set of words to be included in each rap, a style of rap, and/or any other appropriate prompt. In some examples, the prompt may be configured to serve as a whole-trail prompt, to be presented to each user prior to enabling the user to create a media recording for the rap battle trail. Additionally or alternatively, the prompt may be configured to serve as a targeted next-recording prompt, to be presented specifically to the user recording the next rap within the rap battle trail, prior to enabling the user to record the next rap. In these examples, each user may, after and/or as part of recording a rap for the rap battle trail, be prompted to create a prompt to be displayed to the user creating the next rap within the rap battle trail (e.g., by selecting a creative constraint such as a topic, a set of words, a style, etc.).

In some examples, the trail creation interface may enable trail initiator 702 to specify other features of the trail, such as a maximum and/or minimum length of recordings, a digital transformation (e.g., filter) to be applied to recordings, a total number of recordings for the trail to accept, a length of time during which recordings may be added to the trail, a specified user and/or list of users who may add recordings to the trail, a first user to invite to contribute (e.g., to whom to send an initial rap challenge invitation), and/or any other relevant features. In one embodiment, each contributor with permission to contribute to the rap battle trail may be specified by trail initiator 702 during the trail initiation process. Additionally or alternatively, each user recording a rap for the trail may be prompted to select a user to invite (e.g., challenge) to create the next rap within the trail. In these examples, the systems described herein may send a targeted invitation to contribute to a user upon the user's selection (e.g., via an email, a pop-up, a social media notification, etc.).

In one embodiment, the systems described herein may enable trail initiator 702 to specify a limited list of users to participate in the rap battle trail (e.g., via a trail creation interface). Additionally or alternatively, the systems described herein may enable a rap battle trail to be configured such that any user who can view the trail can add a rap to the trail.

At step 722, a trail media recording interface may record an initial rap from trail initiator 702 via mobile device 704 (e.g., via a camera and/or microphone of mobile device 704). In some embodiments, the trail media recording interface may present a prompt specified by trail initiator 702 at step 720. In some examples, the systems described herein may record audio of trail initiator 702. Additionally, in some examples the systems described herein may record video of trail initiator 702. In some embodiments, the systems described herein may apply a digital transformation (e.g., a filter) to the recording of trail initiator 702. Upon recording the initial rap, the systems described herein may store the recording of the initial rap in a digital container associated with the rap battle trail. In some embodiments, a user other than trail initiator 702 may create the recording of the initial rap (not depicted in FIG. 7). In one such embodiment, trail initiator 702 may, at step 720 as part of the trail initiation process, have (1) selected the other user and/or (2) selected content for a targeted prompt specific to the initial recording (e.g., by selecting one or more words, topics, and/or themes for the initial rap). In this embodiment, the disclosed systems and methods may additionally prompt the other user to create a prompt for the next recording within the rap battle trail.

At step 724, the systems described herein may present, to a user 706, the recorded initial rap via a trail consumption interface of a trail app on a mobile device 708. In some embodiments, the systems described herein may then transition into enabling user 706 to record a response rap, either within a portion of the trail consumption interface or within an additional creation interface. Then, at step 726, the systems described herein may record user 706 performing a response rap via the trail app on mobile device 708. In some embodiments, the systems described herein may display a creation prompt in the response creation interface (e.g., a whole-trail creation prompt selected by trail initiator 702 and/or a targeted next-recording prompt). Upon recording the response rap of user 706, the systems described herein may add the recording of user 706 to the digital container.

At step 728, the systems described herein may present to a user other than user 706 (e.g., trail initiator 702 via mobile device 704), the response rap performed by user 706. After transitioning to enabling the user other than user 706 to record a media recording, at step 730, the systems described herein may record, via mobile device 704, the other user performing a rap in response to the response rap. In some embodiments, the systems described herein may display a creation prompt in a response creation interface configured for the rap responding to the response rap (e.g., a whole-trail creation prompt selected by trail initiator 702 and/or a targeted next-recording prompt). Upon recording the rap that responds to the response rap, the systems described herein may add the recording to the digital container configured for the rap battle trail.

In some examples in which the rap responding to the response rap is recorded by trail initiator 702, the systems described herein may (1) enable trail initiator 702 and user 706 to continue recording raps back and forth and (2) continually add the recorded raps to the rap battle trail and/or digital trail container as the raps are recorded. In one such example, the rap battle mode may be specifically configured to only allow the participation of two users. In other embodiments, the systems described herein may facilitate the creation of a rap battle trail that includes raps from multiple users.

Figure 8:
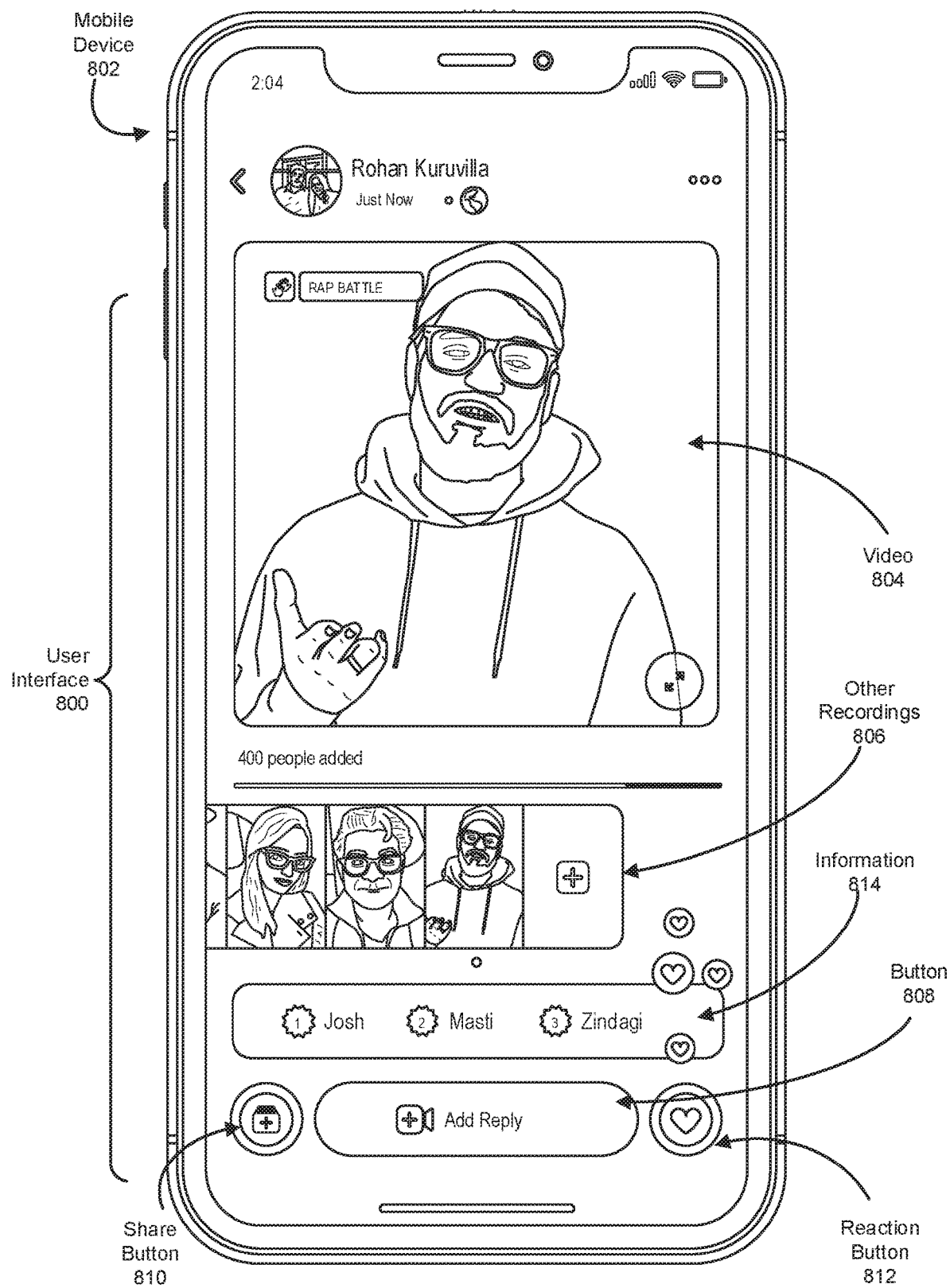
FIG. 8 is an illustration of an exemplary user interface for creating a rap battle trail.

As mentioned above in connection with FIG. 7, the systems described herein may present a media recording of a rap battle trail and/or various information relating to the rap battle trail via a user interface in a trail app. The user interface may take a variety of forms and may include a variety of content. For example, as illustrated in FIG. 8, the systems described herein may provide a user interface 800 that displays a video 804 of a user performing a rap within a rap battle trail via a mobile device 802. As shown in FIG. 8, the systems described may display, within user interface 800, a strip of thumbnails and/or links to other recordings 806 within the rap battle trail. The strip may enable a user to view past/upcoming recordings and/or to navigate between recordings that are part of the same rap battle trail (e.g., by navigating to a composition corresponding to a thumbnail selected via user input). In some examples, other recordings 806 may be organized in a set order (e.g., the order in which the recordings were added). In one example, the systems described herein may be configured to auto-advance between other recordings 806 in the set order but may also enable a user to navigate between other recordings 806 in any order.

In embodiments in which video 804 is displayed to a user who is eligible to add an additional media recording to the rap battle trail, the display of other recordings 806 may include an interface element that launches a media recording interface that enables the user to create the additional media recording. In some embodiments, the launching element may take the form of, or be included as part of, a final thumbnail within the strip of thumbnails. Additionally or alternatively, the launching element may represent an element, such as button 808, that is persistently presented as each of the other recordings 806 are played.

In some embodiments, the systems described herein may display information 814 about the rap battle trail and/or the currently playing media recording within user interface 800 (e.g., alongside video 804). Information 814 may include a variety of content and/or elements. In some examples, information 814 may include a list of the users who have added media recordings to the rap battle trail thus far. In some embodiments, information 814 may enable a user consuming the rap battle trail to navigate to recordings added by each listed user. In some examples, the list may rank users according to the number of recordings added to the rap battle trail, the reactions (e.g., in terms of comments and/or social media reacts) to the user's recordings in the rap battle trail, and/or some other metric relevant to the rap battle trail. In some examples, information 814 may include information detailing one or more creative constraints (e.g., whole-trail creative constraints and/or creative constraints specific to a recording currently being presented).

In some embodiments, the systems described herein may display a share button 810 within user interface 800 that enables the user interacting with user interface 800 to share the trail and/or an individual media recording from within the trail and/or a reaction button 812 that enables the user to add a reaction (e.g., like, love, etc.) to the trail and/or the media recording currently presented (e.g., video 804).

Moving on from rap battle trails, in another example of a call-and-response mode, a radio mode may facilitate the creation of a radio trail. In a radio mode, a trail initiator may represent a host of a radio show and the recordings within a radio trail may alternate between host recordings and reply recordings by consumers of the radio show (e.g., recordings that ask the host questions and/or comment on things the host has said). In some examples, the alternation may occur in a 1:1 ratio (with one reply recording following each host recording). In other examples, multiple reply recordings may follow a host recording.

In one embodiment, a radio trail may be a live radio trail. In some examples, the systems described herein may (1) enable listeners of a live radio trail to place a call to the host of the trail, (2) record the call, and/or (3) add the recording of the call to the live radio trail as the call is recorded. In one example, the call and/or recording may be a call and/or recording of only the listener. In other examples, the call and/or recording may be and/or record a multi-way communication between one or more hosts and one or more listeners.

Figure 9:
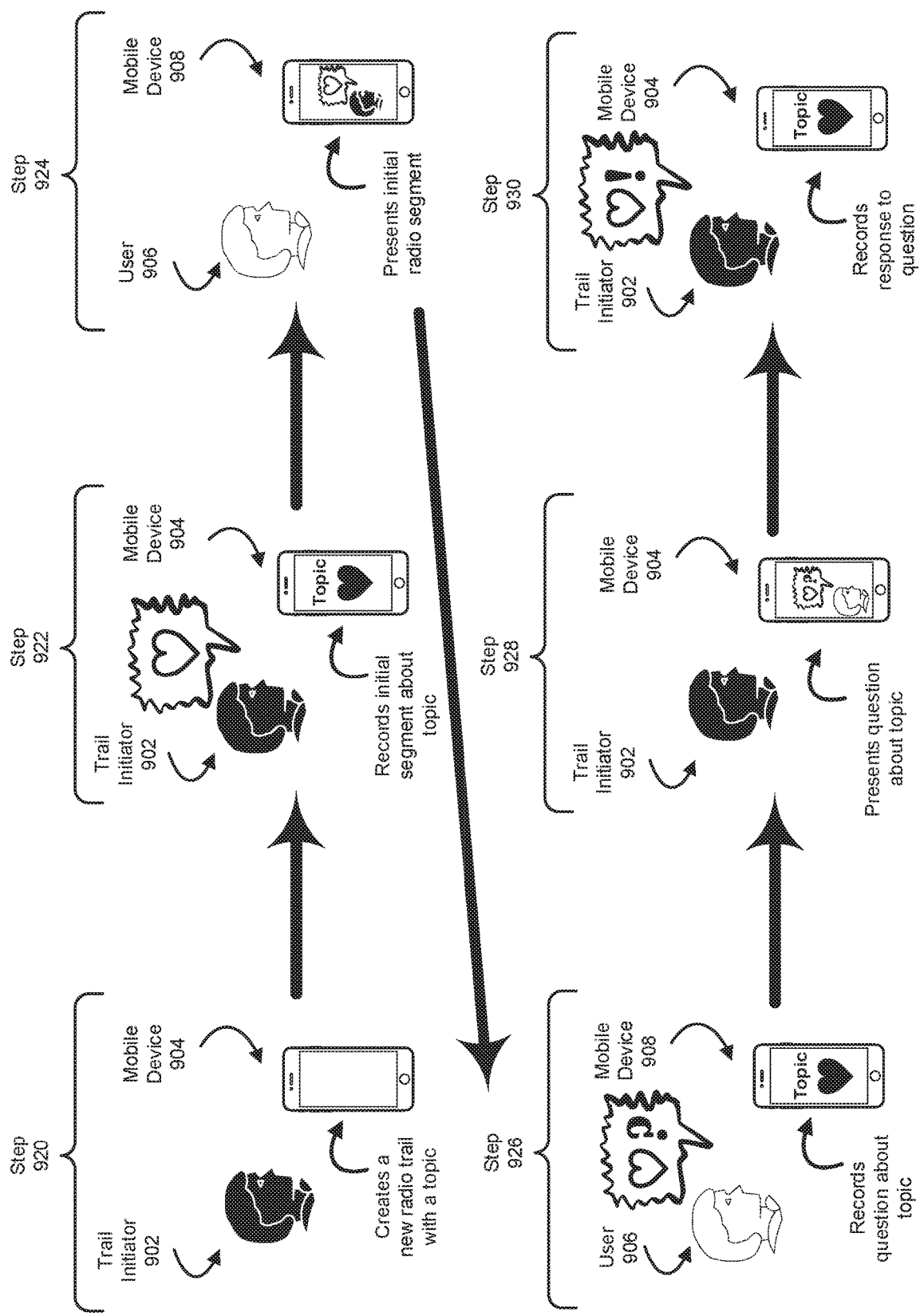
FIG. 9 is an illustration of an exemplary method for creating a radio trail.

FIG. 9 illustrates an example method for creating a radio trail. At step 920, in response to input from a trail initiator 902 via a mobile device 904 (e.g., via a trail creation interface in a trail app), the systems described herein may create a new radio trail and/or a digital container for a new radio trail. In some examples, the trail creation interface may enable trail initiator 902 to specify a prompt for the radio trail, such as a topic for discussion, a question for each listener to answer, and/or any other appropriate prompt.

In some embodiments, the systems described herein may enable trail initiator 902 to specify an overarching prompt for the entire live radio trail. Additionally or alternatively, the systems described herein may enable trail initiator 902 to change the prompt and/or create a new prompt at any time while the radio trail is active. For example, in some examples, the systems described herein may enable trail initiator 902 to change the prompt in between each media recording added to the trail. In one example, the systems described herein may enable trail initiator 902 to input a series of prompts and may iterate through the series of prompts at set intervals (e.g., after a certain number of media recordings per prompt and/or after a certain time period).

In some embodiments, the systems described herein may enable trail initiator 902 to configure a radio trail such that each media recording submitted to the media trail must be approved by trail initiator 902 before being added to the radio trail. For example, the systems described herein may enable trail initiator 902 to preview media recordings from other users before adding the media recordings to the radio trail. In some embodiments, a radio trail may include only audio recordings with no video component.

At step 922, the systems described herein may record an initial segment of trail initiator 902 speaking about a topic selected by trail initiator 902 for the radio trail (e.g., via a camera and/or microphone of mobile device 904). In some examples, the topic may be a topic of discussion for listeners to ask questions about, a question for listeners to answer, and/or a general prompt for discussion. For example, trail initiator 902 may ask listeners to describe a dating predicament. In some embodiments, the systems described herein may display the topic in the recording interface. In one embodiment, the systems described herein may add the initial segment of the trail to a digital trail container.

In one embodiment, the systems described herein may enable trail initiator 902 to create a radio station (e.g., radio show) in which each episode of the radio station is an individual radio trail. Additionally or alternatively, the systems described herein may enable trail initiator 902 to create a radio station such that the station is a single ongoing trail. In one embodiment, the systems described herein may create sub-containers for different episodes of a radio show within a radio trail. In some example, the systems described herein may display a list of episodes for a radio show within a radio trail consumption interface and/or enable users to select which episode of a radio show to play via the radio trail consumption interface.

At step 924, the systems described herein may present the initial radio segment to a user 906 via a mobile device 908. In some embodiments, the systems described herein may present radio trails via a trail consumption interface of a trail app. Additionally or alternatively, the systems described herein may present radio trails via a radio consumption app and/or radio station that may be separate from a trail app. In one embodiment, the systems described herein may only present active radio trails (e.g., trails to which recordings may be added) via a trail app and not a radio app but may present finished radio trails (e.g., trails to which recordings may no longer be added) via the radio app in addition to the trail app. In one embodiment, the systems described herein may present a given radio trail in both a trail app and a radio app with different methods for adding a recording. For example, the trail app may have a recording interface while the radio app may include an interface element that lets a listener call the trail initiator (who may initiate a recording of the call and add the recording to the trail).

In some embodiments, the systems described herein may display, via a trail consumption interface provided by the trail app on mobile device 908, the media recording of the initial radio segment, and may then transition into enabling user 906 to create a recording discussing the topic of the radio segment, either within a portion of the trail consumption interface or within an additional creation interface.

Next, at step 926, the systems described herein may receive user input submitted to mobile device 908 initiating a reply recording to the initial radio segment. In response to receiving the user input, the systems described herein may initiate a reply recording (e.g., by providing a recording interface of a trail app on mobile device 908) of user 906 responding to the initial radio segment (e.g., answering or asking a question as prompted by the initial radio segment). In some embodiments, the systems described herein may automatically add the reply recording created by user 906 to the radio trail such that the recording is accessible by any user who can access the trail. In other embodiments, the systems described herein may add the reply recording to a queue for review by trail initiator 902 (e.g., within a trail management interface in a trail app). In one embodiment, the systems described herein may add the reply recording to the digital trail container as soon as the reply recording is received. Alternatively, the systems described herein may add the reply recording to the digital trail container after the reply recording is approved by trail initiator 902.

At step 928, the systems described herein may play the reply recording of user 906 for trail initiator 902 (e.g., via mobile device 904). Additionally or alternatively, the systems described herein may play the reply recording via a radio station and/or for one or more additional users listening to the radio trail via instances of the trail app (e.g., at the same time as the reply recording is played for trail initiator 902 and/or after trail initiator 902 has approved the reply recording). In some examples (e.g., in which the host to responder ratio is 1:1), the systems described herein may play a single reply recording at step 928. In other examples, multiple reply recordings may be played at step 928. In some embodiments, the systems described herein may play one or more reply recordings via a trail management interface in a trail app. Additionally or alternatively, the systems described herein may play one or more reply recordings via a radio app.

After receiving the one or more reply recording and/or adding the one or more reply recordings to a trail container associated with the radio trail, the systems described herein may enable trail initiator 902 to record an additional media recording responding to the reply recording and/or prompting a new set of one or more reply recordings (e.g., via a radio trail management interface, a media recording interface, and/or a radio app). Then, at step 930, the systems described herein may receive the additional media recording. Following step 930, the systems described herein may cyclically enable trail initiator 902 and one or more additional users to create recordings for the radio trail. In some embodiments, a radio trail may strictly alternate between compositions created by the trail initiator and compositions created by other users, with each composition by the trail initiator followed by a composition by another user and vice versa. Additionally or alternatively, the systems described herein may facilitate the creation of a radio trail that includes multiple adjacent segments recorded by the trail initiator and/or multiple adjacent segments by other users.

Figure 10:
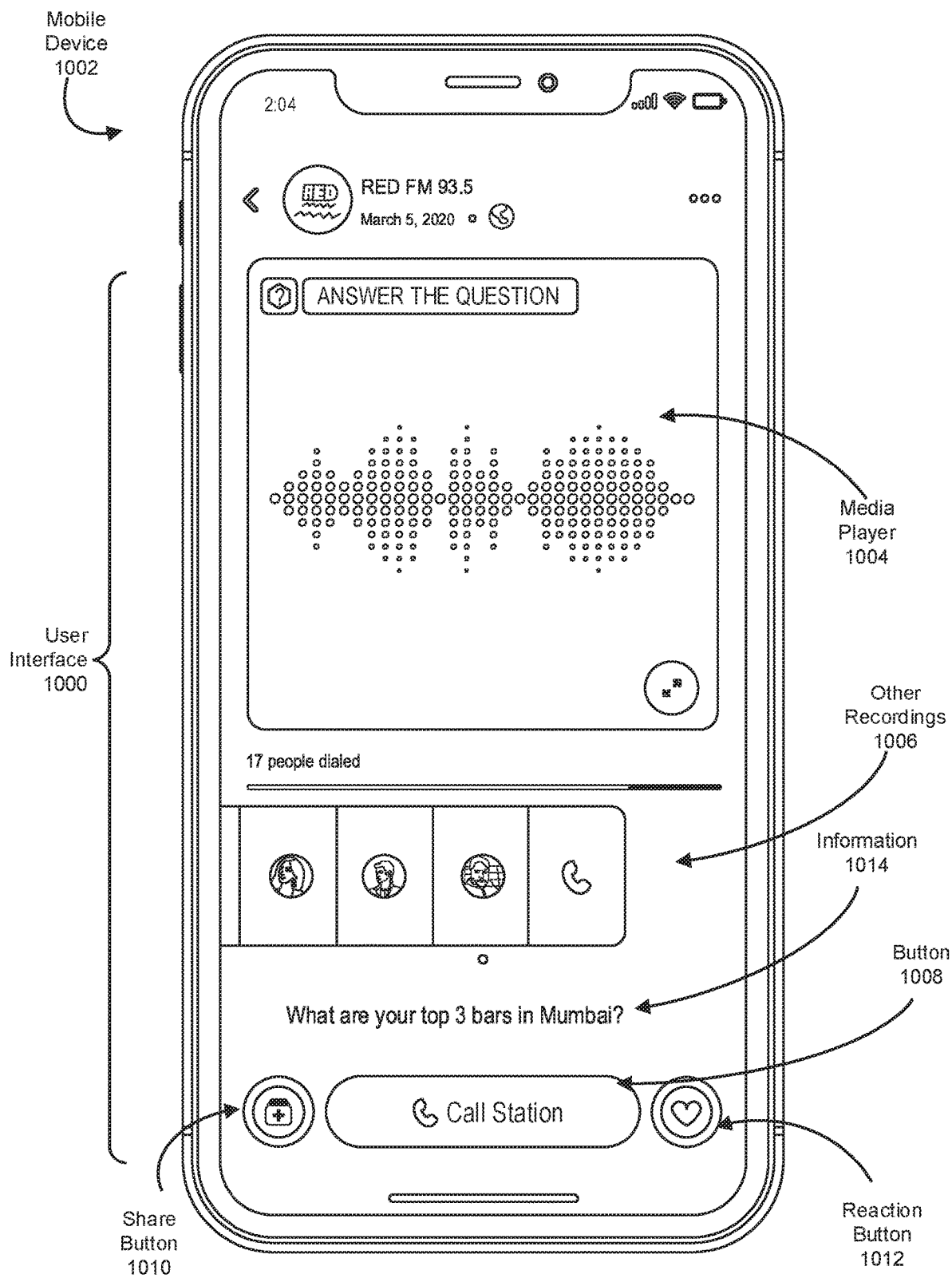
FIG. 10 is an illustration of an exemplary user interface for creating a radio trail.

In some embodiments, the systems described herein may present the media recordings of a radio trail and/or various information about the media recordings via a user interface in a trail app. For example, as illustrated in FIG. 10, the systems described herein may display, within a user interface 1000, a media player 1004. Media player 1004 may play, one by one, the trail's recordings (e.g. audio recordings that are part of a radio trail). In some embodiments, the systems described may additionally display a strip of thumbnails and/or links to other recordings 1006 that may enable a user to listen to past recordings (and/or upcoming recordings in non-live embodiments) and/or to navigate between recordings that are part of the same radio trail. In some examples, other recordings 1006 may be organized in a set order (e.g., the order in which the recordings were added). In one example, the systems described herein may be configured to auto-advance between other recordings 1006 in the set order but may also enable a user to navigate between other recordings 1006 in any order.

In embodiments in which media player 1004 is displayed to a user who is eligible to add an additional media recording to the trail, the display of other recordings 1006 may include an interface element that launches a media recording interface that enables a viewer to create an audio recording to be added to the radio trail and/or that calls a number associated with the trail initiator. In some embodiments, the launching element and/or call element may take the form of, or be included as part of, a final thumbnail within the strip of thumbnails (e.g., as illustrated in FIG. 8). Additionally or alternatively, the launching element and/or call element may represent an element, such as button 1008 in FIG. 10, that is persistently presented as each of the other recordings 1006 are played.

In some embodiments, the systems described herein may display information 1014 about the radio trail and/or a currently playing recording alongside media player 1004. Information 1014 may include a variety of content and/or elements. In some examples, information 1014 may include a topic of the radio trail (e.g., as selected by the trail initiator). In some embodiments, the systems described herein may display a share button 1010 that enables the user to share the trail and/or an individual media recording from within the trail and/or a reaction button 1012 that enables the user to add a reaction (e.g., like, love, etc.) to the trail and/or the media recording currently presented (e.g., via media player 1004).

Moving on from call-and-response modes, in some embodiments, the systems described herein may facilitate the creation of a passive commentary and/or media response trail that includes compositions that respond to a work of media that is not itself part of the trail, such as a film, an audiobook, a series, etc. As a specific example, a podcast mode may facilitate the creation of a podcast trail that includes media recordings related to a specific episode of a podcast. The term "podcast" may generally refer to a series of audio recordings on a theme and/or one episode from the series of recordings.

Figure 11:
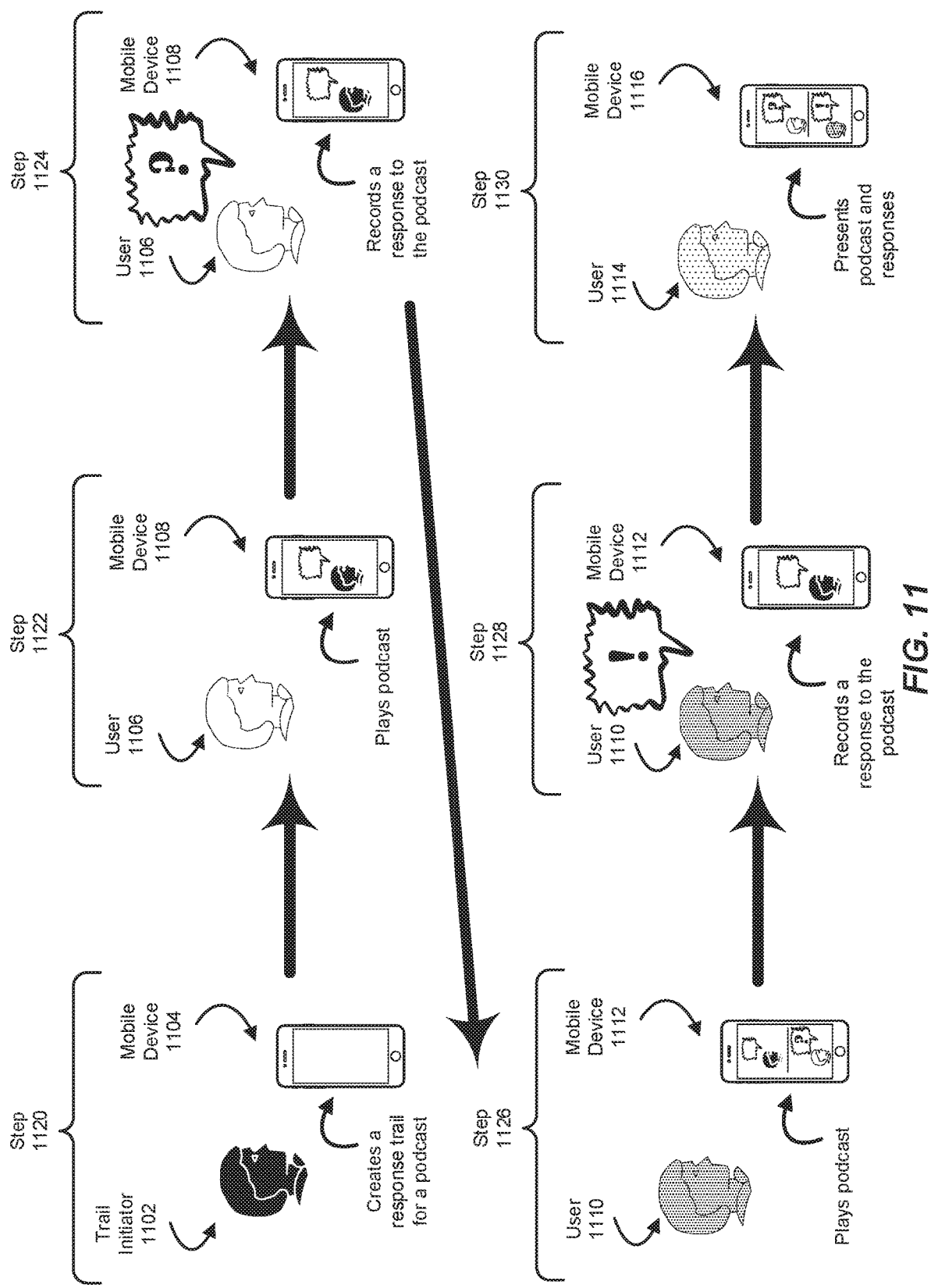
FIG. 11 is an illustration of an exemplary method for creating a podcast response trail.

FIG. 11 illustrates an example method for creating a podcast trail. At step 1120, in response to input from a trail initiator 1102 via a mobile device 1104, the systems described herein may create a new podcast trail for an episode of a podcast. In one example, the systems described herein may receive input that selects the podcast mode and/or that specifies a podcast. In some examples, the systems described herein may receive the input via a trail creation interface of a trail app. Additionally or alternatively, the systems described herein may receive the input via an interface of a podcast app. In these embodiments, the podcast app may include an interface for creating and/or viewing podcast response trails. Additionally or alternatively, the podcast app may include a user interface element that directs users to the trail app to create and/or view a podcast trail.

In some embodiments, the systems described herein may create (e.g., initiate) a podcast trail for a podcast by creating a digital container for podcast responses that is associated with the podcast. In some embodiments, the digital container may not contain the podcast. In one such embodiment, the digital container may contain a pointer and/or reference to the podcast and/or may be digitally linked to the podcast and/or a reference to the podcast within a storage system (e.g., on a server that stores data for trails). In some embodiments, when initiating the podcast trail, the systems described herein may also initiate an instance of a trail consumption interface that includes a media player configured to play the podcast and/or responses to the podcast.

Once a podcast trail has been initiated for a podcast, at step 1122, the systems described herein may, via a trail app on a mobile device 1108 and/or via a podcast app, play an episode of the podcast for a user 1106. In some embodiments, the systems described herein may present, via a trail consumption interface and/or podcast consumption interface provided by the trail app on mobile device 1108, the podcast. For example, the systems described herein may present a trail consumption interface that includes a media player configured to play the podcast. In some embodiments, the systems described herein may enable user 1106 to respond to the podcast, either within a portion of the trail consumption interface and/or podcast consumption interface or within an additional creation interface.

Then, at step 1124, the systems described herein may, via the trail app on mobile device 1108, receive a recording of user 1106 discussing a response to the podcast (e.g., recorded via a camera and/or microphone of mobile device 1104). In some embodiments, the systems described herein may tag the response with a relevant timestamp from the episode of the podcast. In some embodiments, the systems described herein may enable user 1106 to pause the podcast at the timestamp in order to record a response, automatically tag the response with the timestamp at which the podcast is paused, and then resume listening to the podcast. In these embodiments, the systems described herein may automatically tag the response with the timestamp at which the podcast was paused. Additionally or alternatively, the systems described herein may enable user 1106 to manually specify a timestamp to associate with the response. Upon receiving the response, the systems described herein may add the response to a digital container for the podcast trail.

After adding the recording to the digital container for the podcast trail, at step 1126, the systems described herein may, via an interface provided by a trail app on a mobile device 1112 and/or a podcast app on mobile device 1112, play the episode of the podcast for an additional user 1110. In addition to enabling additional user 1110 to listen to the episode of the podcast via the interface, the systems described herein may enable additional user 1110 to (1) listen to one or more responses to the podcast from within the podcast trail (e.g., the response created at step 1124) and (2) record a response to the podcast to be added to the podcast trail. In one embodiment, as shown at step 1128, the systems described herein may then add a response to the podcast recording by additional user 1110 via the interface to a digital container for the podcast trail and/or podcast. At step 1130, the systems described herein may, via an interface provided by a trail app on a mobile device 1116, play the podcast and the recorded responses to the podcast via the podcast trail for another additional user 1114, who may in turn be enabled to also record responses to the podcast.

In some examples, the systems described herein may cause podcast responses tagged with an associated timestamp to become visible and/or be emphasized in the interface when the podcast reaches the relevant timestamp. In some embodiments, the systems described herein may enable user 1114 to listen to the podcast, pause the podcast, listen to one or more responses, and then resume listening to the podcast. In one embodiment, the systems described herein may present a selectable element (e.g., a thumbnail, a button, etc.) corresponding to the media recording and may play the media recording if the user selects the selectable element.

Figure 12:
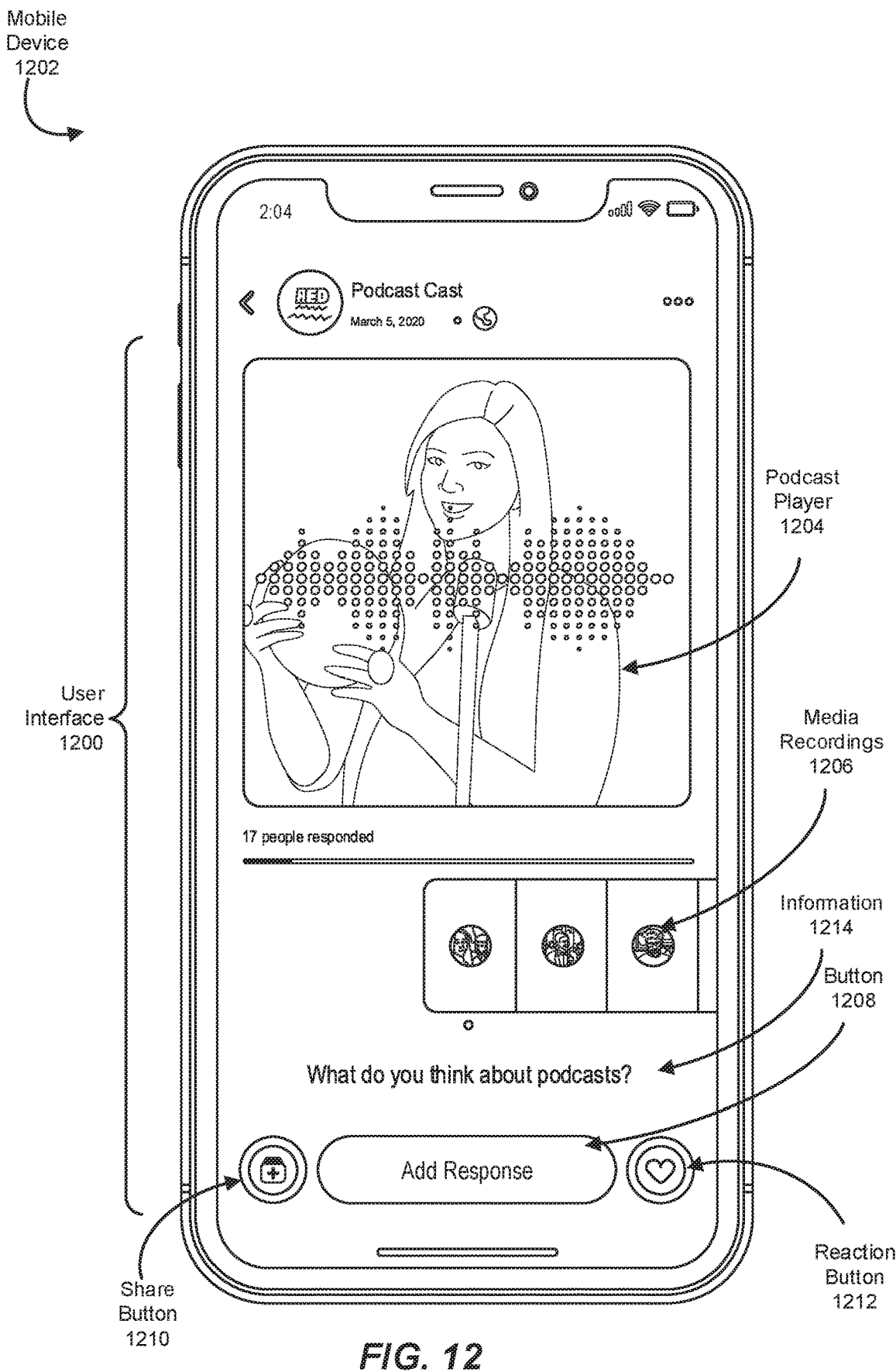
FIG. 12 is an illustration of an exemplary user interface for creating a podcast response trail.

As mentioned previously, the systems described herein may present the podcast and/or podcast response trail via a user interface in a trail app. For example, as illustrated in FIG. 12, a trail app on a mobile device 1202 may present an interface 1200 with a podcast player 1204 that plays an episode of a podcast. In the same interface, the trail app may present a trail of recordings 1206 recorded in response to the podcast. As discussed above, in some embodiments, interface 1200 may enable a user to alternate between playing the podcast and playing recordings from the trail in podcast player 1204.

In some embodiments, the systems described may display a strip of thumbnails and/or links to other recordings 1206 that may enable a user to listen to past/upcoming podcast responses and/or to navigate between podcast responses that are part of the same podcast trail (e.g., by navigating to a composition corresponding to a thumbnail selected via user input). In some examples, other recordings 1206 may be organized in a set order (e.g., based on a timestamp associated with each response, such that responses associated with earlier timestamps are to the left of responses associated with later timestamps). In other examples (not depicted), instead of thumbnails being linearly arranged in a continuous strip, each thumbnail of a recording may be placed at a portion of a progress bar within user interface 1200 corresponding to the recording's timestamp, such that some portions of the progress bar will not be visually associated with any thumbnails and other portions of the progress bar will be visually associated with a cluster of thumbnails.

In one example, the systems described herein may be configured to auto-advance between other recordings 1206 (e.g., as each recording is played and/or as the podcast moves to the timestamp associated with each recording) in the set order but may also enable a user to navigate between other recordings 1206 in any order. Additionally or alternatively, the systems described herein may highlight and/or otherwise emphasize a recording in other recordings 1206 when a timestamp associated with the recording is reached in a podcast playing via podcast player 1204. In one embodiment, the systems described herein may be configured to play the podcast without automatically pausing the podcast to play other recordings 1206, only pausing to play another recording in response to receiving user input selecting the other recording.

In embodiments in which podcast player 1204 is displayed to a user who is eligible to add an additional media recording to the podcast response trail, the display of other recordings 1206 may include an interface element that launches a media recording interface that enables a viewer to create a podcast response to be added to the radio trail. In some embodiments, the launching element may take the form of, or be included as part of, a final thumbnail within the strip of thumbnails (e.g., as illustrated in FIG. 8). Additionally or alternatively, the launching element may represent an element, such as button 1208 in FIG. 12, that is persistently presented as the podcast and/or each of the other recordings 1206 are played.

In some embodiments, the systems described herein may display information 1214 about the podcast, and/or about a response recording currently playing, alongside podcast player 1204. Information 1214 may include a variety of content and/or elements. For example, information 1214 may include the name or topic of the podcast, information about the currently playing podcast response (e.g., a username of a user who created the response), and/or other relevant information about the podcast. In some embodiments, the systems described herein may display a share button 1210 that enables the user to share the trail and/or an individual podcast response from within the trail and/or a reaction button 1212 that enables the user to add a reaction (e.g., like, love, etc.) to the trail and/or the podcast response currently presented (e.g., via podcast player 1204). While FIGS. 11 and 12 are discussed in terms of a podcast trail, the embodiments discussed therein may also be applied to trails directed to any type or form of other media work (e.g., a film, a video series, an audiobook, etc.).

Figure 13:
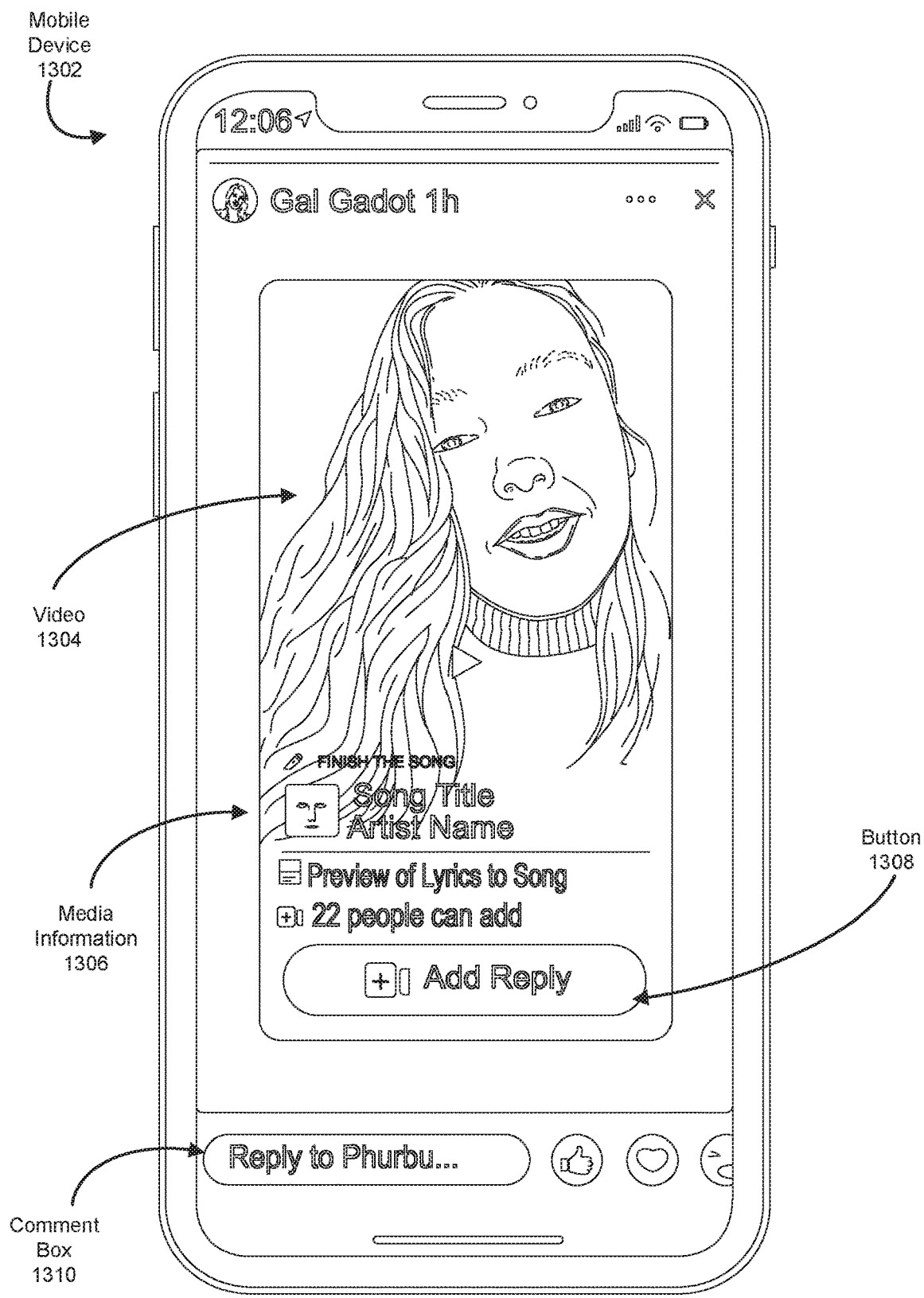
FIG. 13 is an illustration of an exemplary user interface for a song-based media trail.

The systems described herein may display trails in various ways and/or contexts. As illustrated in FIG. 13 (in connection with a song-based trail), in some embodiments, the systems described herein may display a video 1304 from a trail. In some embodiments, the systems described may display media information 1306 relating to the video (e.g., the title of the song, album art for the song, the original artist of the song, the lyrics being sung in the current section of the song, the number of sections currently recorded and/or remaining in the song, the popularity of the song, and/or additional information). In some embodiments, the systems described herein may display media information 1306 before playing video 1304 (as shown in FIG. 13) and/or after playing video 1304. Additionally or alternatively, the systems described herein may display some or all of media information 1306 as an overlay while playing video 1304. In some embodiments, the systems described herein may enable a user to view video 1304 in a full screen format. In some embodiments, if the systems described herein are displaying the media recording to a user who is eligible to add an additional media recording to the trail, the systems described herein may display a button 1308 that launches an interface that enables the user to create a media recording of the next section of the song. Additionally or alternatively, the systems described herein may display a comment box 1310 that enables the user to leave a comment (e.g., text, image, and/or other media) on the trail as a whole and/or the current media recording being displayed.

As described above, the systems and methods described herein may facilitate the creation of various types of digital trails that each contain audio and/or video recordings. In some examples, a digital trail may include compositions that create or recreate a performance such as a song, a dialogue, and/or a dance. In other examples, a digital trail may record users playing a game, such as antakshari, or having a friendly competition, such as a rap battle. In some examples, a digital trail may be a conversation between one user and one or more other users, such as a radio trail. Additionally or alternatively, a trail may respond to a work of media, such as a podcast. In some examples, a digital trail may be completed after a limited number of compositions. In other examples, a digital trail may accept new compositions for an indefinite period. In some embodiments, a digital trail interface may enable users to both view previously recorded media items in a trail and record new media items for the trail within the same interface. By enabling users to create and view digital trails, the systems and methods described herein may give users creative outlets and/or increase engagement with a social media platform.

Example Embodiments

Example 1: A computer-implemented method may include (i) receiving user input initiating a digital trail, the user input including a selection of a trail mode from a list of candidate modes, (ii) creating a digital trail container configured to contain a series of thematically related media recordings generated by users invited to contribute to the digital trail, (iii) providing, to one or more users, a creation prompt that corresponds to the trail mode, (iv) adding, to the digital trail container, at least one media recording received in response to providing the creation prompt, and (v) displaying the resulting digital trail by sequentially presenting each media recording added to the digital trail container in the order added.

Example 2: The computer-implemented method of example 1, where the at least one media recording is recorded via at least one of a camera or a microphone of a user device.

Example 3: The computer-implemented method of examples 1-2, where providing, to the one or more users, the creation prompt that corresponds to the trail mode may include providing the creation prompt to a user immediately after sequentially presenting, as part of a consumption process, each media recording already added to the digital trail container in the order added.

Example 4: The computer-implemented method of examples 1-3, where the trail mode includes a digital transformation to be applied to each media recording added to the digital trail container and adding, to the digital trail container, the at least one media recording received in response to providing the creation prompt includes applying the digital transformation to the at least one media recording.

Example 5: The computer-implemented method of examples 1-4, where the trail mode includes a segmented-creation mode that facilitates creation of a segmented trail in which each media recording includes a different sequential segment of at least one of a dialogue, a song, or a choreography.

Example 6: The computer-implemented method of examples 1-5, where the trail mode includes a group karaoke mode that facilitates creation of a group karaoke trail in which each media recording includes a karaoke recording of a user singing a different sequential segment of a song selected by a trail initiator.

Example 7: The computer-implemented method of examples 1-6, where the creation prompt facilitates a karaoke recording of a segment of the song and includes (i) a display of lyrics corresponding to the segment of the song, (ii) audio of instrumental music corresponding to the segment of the song, and/or (iii) an animation that emphasizes a word within the lyrics at a time at which the word is expected to be sung.

Example 8: The computer-implemented method of examples 1-7, where the creation prompt includes a set of words and an instruction to utilize the set of words while recording such that each media recording added to the digital trail container includes a user uttering of the set of words.

Example 9: The computer-implemented method of examples 1-8, where the trail mode includes a rap battle mode that facilitates creation of a rap battle trail in which each media recording includes a recording of a user performing a rap, recorded in response to at least one of (1) a previous media recording in the rap battle trail or (2) the creation prompt.

Example 10: The computer-implemented method of examples 1-9, where the trail mode promotes, for each media recording added to the digital trail container after an initial media recording, a specified relationship between (1) the media recording and (2) a previous media recording that immediately precedes the media recording within the digital trail.

Example 11: The computer-implemented method of examples 1-10, where (i) the trail mode includes a sequential creation mode that facilitates creation of a sequence-based trail in which, (ii) each media recording includes a recording of a user uttering one or more words, and (iii) for each media recording added to the digital trail container after the initial media recording, a first word uttered is the same word as a last word uttered in the previous media recording that immediately precedes the media recording within the digital trail.

Example 12: The computer-implemented method of examples 1-11, where the sequential creation mode includes an antakshari mode, the sequence-based trail includes an antakshari trail, and each media recording includes a different song.

Example 13: The computer-implemented method of examples 1-12, where the creation prompt includes (i) a list of selectable songs that begin with a first word that matches the last word of a song in the previous media recording, (ii) a display of lyrics corresponding to a segment of a song that begins with the first word that matches the last word of the song in the previous media recording, (iii) audio of instrumental music corresponding to a segment of the song, and/or (iv) an animation that emphasizes a word within lyrics of a song at a time at which the word is expected to be sung.

Example 14: The computer-implemented method of examples 1-13, where the trail mode includes a live radio mode that facilitates the creation of a live radio trail in which sequential media recordings alternate between an initiator recording created by a trail initiator and a response recording that responds to the initiator recording.

Example 15: The computer-implemented method of examples 1-14, where the trail mode includes a commentary trail mode that corresponds to a media work such that each media recording responds to the media work.

Example 16: The computer-implemented method of examples 1-15, where the commentary trail mode includes a podcast commentary mode and the media work includes a podcast.

Example 17: The computer-implemented method of examples 1-16, where the computer-implemented method may further include (i) presenting the media work via a digital trail interface, (ii) receiving, via the digital trail interface, a media recording that corresponds to a timestamp of the media work, and (iii) after receiving the media recording, presenting, in a portion of the digital trail interface associated with the timestamp, a selectable element corresponding to the media recording.

Example 18: The computer-implemented method of examples 1-17, where the creation prompt includes (i) one or more songs, from a predetermined catalogue of songs, to be selected by a trail initiator as part of the user input, (ii) one or more words, from a predetermined list of words, to be selected by the trail initiator as part of the user input, and/or (iii) one or more transformations to be selected by the trail initiator as part of the user input.

Example 19: A system for implementing the above-described method may include at least one physical processor and physical memory that includes computer-executable instructions that, when executed by the physical processor, cause the physical processor to (i) receive user input initiating a digital trail, the user input comprising a selection of a trail mode from a list of candidate modes, (ii) create a digital trail container configured to contain a series of thematically-related media recordings generated by users invited to contribute to the digital trail, (iii) provide, to one or more users, a creation prompt that corresponds to the trail mode, (iv) add, to the digital trail container, at least one media recording received in response to providing the creation prompt, and (v) display the resulting digital trail by sequentially presenting each media recording added to the digital trail container in the order added.

Example 20: A non-transitory computer-readable medium may include one or more computer-readable instructions that, when executed by at least one processor of a computing device, cause the computing device to (i) receive user input initiating a digital trail, the user input comprising a selection of a trail mode from a list of candidate modes, (ii) create a digital trail container configured to contain a series of thematically-related media recordings generated by users invited to contribute to the digital trail, (iii) provide, to one or more users, a creation prompt that corresponds to the trail mode, (iv) add, to the digital trail container, at least one media recording received in response to providing the creation prompt, and (v) display the resulting digital trail by sequentially presenting each media recording added to the digital trail container in the order added.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    creating a digital trail container configured to contain a series of sequentially related media recordings generated by users invited to contribute to a digital trail, wherein each media recording is configured to include a recording of a user singing a song;
    after adding an initial media recording to the digital trail container, providing, to one or more users, a creation prompt that comprises (1) a list of selectable songs that include a word that matches a word selected from a song in a previous media recording added to the digital trail container and (2) a prompt to (i) select one of the songs from the list and (ii) sing the selected song;
    adding, to the digital trail container, at least one media recording received in response to providing the creation prompt; and
    displaying the resulting digital trail by sequentially presenting each media recording added to the digital trail container in the order added.

2. The computer-implemented method of claim 1, wherein the at least one media recording is recorded via at least one of a camera or a microphone of a user device.

3. The computer-implemented method of claim 1, wherein the digital trail comprises a digital antakshari trail.

4. The computer-implemented method of claim 1, wherein each media recording within the digital trail is configured to include a recording of a user signing a different song.

5. The computer-implemented method of claim 1, further comprising:
    prior to creating the digital trail container, providing a trail initiator with a trail initiation interface that enables the trail initiator to at least one of (1) select a list of candidate songs for inclusion in the digital trail, (2) specify a digital transformation to be applied to each media recording added to the digital trail, (3) specify at least one of a minimum or maximum length for each media recording added to the digital trail, (4) specify an audience for the digital trail, or (5) record or supply the initial media recording; and
    creating the digital trail container in response to digital input received via the trail initiation interface.

6. The computer-implemented method of claim 1, wherein:
    each song within the digital trail is configured to comprise an entire song; or
    each song within the digital trail is configured to comprise a portion of a song.

7. The computer-implemented method of claim 1, further comprising enabling a user to digitally share the digital trail.

8. The computer-implemented method of claim 1, further comprising applying a same digital transformation to each media recording added to the digital trail container.

9. The computer-implemented method of claim 8, wherein the digital transformation comprises at least one of:
   a visual filter;
   a speed setting; or
   a mixed reality element.

10. The computer-implemented method of claim 1, wherein:
   the creation prompt corresponds to a current media recording currently being created; and
   the previous media recording, relied on in the creation prompt, comprises a media recording that immediately precedes the current media recording within the digital trail.

11. The computer-implemented method of claim 1, wherein the word, selected from the song in the previous media recording, comprises the last word of the song in the previous media recording.

12. The computer-implemented method of claim 1, wherein the list of selectable songs, which include the word, comprises a list of selectable songs that begin with the word.

13. The computer-implemented method of claim 1, wherein the word, selected from the song in the previous media recording, is selected in response to at least one of:
   parsing lyrics of the song in the previous media recording for nouns or verbs that are repeated more than a certain number of times;
   parsing lyrics of the song in the previous media recording for words that will trigger a largest number of subsequent song options;
   parsing lyrics of the song in the previous media recording for words most likely to be selected by a subsequent user; or
   receiving the word from a machine learning system.

14. The computer-implemented method of claim 1, wherein:
   the creation prompt is configured to enable recording a media recording of the selected song, selected from the list of selectable songs, for the digital trail;
   the creation prompt further comprises at least one of:
   a display of lyrics corresponding to the selected song;
   audio of instrumental music corresponding to the selected song; or
   an animation that emphasizes a word within the lyrics of the selected song at a time at which the word within the lyrics is expected to be sung.

15. The computer-implemented method of claim 1, wherein:
   presenting each media recording comprises presenting each media recording within a trail consumption interface; and
   the method further comprises:
      providing a launching element within the trail consumption interface that enables recording an additional media recording to be added to the digital trail; and
      providing an additional instance of the creation prompt in response to receiving user input selecting the launching element.

16. The computer-implemented method of claim 1, further comprising creating an additional digital trail container for media recordings in a segmented trail in which each media recording comprises a different sequential segment of at least one of a dialogue, a song, or a choreography.

17. The computer-implemented method of claim 16, wherein the segmented trail comprises a group karaoke trail in which each media recording comprises a karaoke recording of a user singing a different sequential segment of a karaoke song selected by a trail initiator.

18. The computer-implemented method of claim 17, wherein:
   the method further comprising providing an additional creation prompt that facilitates creating a karaoke recording of a segment of the karaoke song, wherein the additional creation prompt comprises at least one of:
   a display of lyrics corresponding to the segment of the karaoke song;
   audio of instrumental music corresponding to the segment of the karaoke song; or
   an animation that emphasizes a word within the lyrics at a time at which the word within the lyrics is expected to be sung.

19. A system comprising:
   at least one physical processor;
   physical memory comprising computer-executable instructions that, when executed by the physical processor, cause the physical processor to:
      create a digital trail container configured to contain a series of sequentially related media recordings generated by users invited to contribute to a digital trail, wherein each media recording is configured to include a recording of a user singing a song;
      after adding an initial media recording to the digital trail container, provide, to one or more users, a creation prompt that comprises (1) a list of selectable songs that include a word that matches a word selected from a song in a previous media recording added to the digital trail container and (2) a prompt to (i) select one of the songs from the list and (ii) sing the selected song;
      add, to the digital trail container, at least one media recording received in response to providing the creation prompt; and
      display the resulting digital trail by sequentially presenting each media recording added to the digital trail container in the order added.

20. A non-transitory computer-readable medium comprising one or more computer-readable instructions that, when executed by at least one processor of a computing device, cause the computing device to:
   create a digital trail container configured to contain a series of sequentially related media recordings generated by users invited to contribute to a digital trail, wherein each media recording is configured to include a recording of a user singing a song;
   after adding an initial media recording to the digital trail container, provide, to one or more users, a creation prompt that comprises (1) a list of selectable songs that include a word that matches a word selected from a song in a previous media recording added to the digital trail container and (2) a prompt to (i) select one of the songs from the list and (ii) sing the selected song;
   add, to the digital trail container, at least one media recording received in response to providing the creation prompt; and display the resulting digital trail by sequentially presenting each media recording added to the digital trail container in the order added.

\* \* \* \* \*